(12) United States Patent
Noda et al.

(10) Patent No.: US 12,184,821 B2
(45) Date of Patent: Dec. 31, 2024

(54) IMAGE READING APPARATUS TO SUPPRESS SKEWING OF MEDIUM

(71) Applicant: SEIKO EPSON CORPORATION, Tokyo (JP)

(72) Inventors: Kazuhito Noda, Shiojiri (JP); Keisuke Miyauchi, Matsumoto (JP); Kiyotaka Nakamura, Kitakyushu (JP); Shuichi Kadota, Fukuoka (JP); Hidenori Harada, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/173,148

(22) Filed: Feb. 23, 2023

(65) Prior Publication Data

US 2023/0276003 A1 Aug. 31, 2023

(30) Foreign Application Priority Data

Feb. 25, 2022 (JP) ................................ 2022-027688

(51) Int. Cl.
*H04N 1/00* (2006.01)
(52) U.S. Cl.
CPC ....... *H04N 1/00602* (2013.01); *H04N 1/0061* (2013.01); *H04N 1/00615* (2013.01); *H04N 1/00628* (2013.01); *H04N 2201/0081* (2013.01)

(58) Field of Classification Search
None
See application file for complete search history.

(56) References Cited

U.S. PATENT DOCUMENTS

| 2006/0209153 | A1* | 9/2006 | Nishida | B41J 13/0045 |
| | | | | 347/104 |
| 2021/0188576 | A1* | 6/2021 | Umi | B65H 3/0669 |
| 2022/0407971 | A1* | 12/2022 | Nishinohara | H04N 1/00602 |

FOREIGN PATENT DOCUMENTS

JP 2019097057 A 6/2019

* cited by examiner

*Primary Examiner* — Andrew H Lam
(74) *Attorney, Agent, or Firm* — CHIP LAW GROUP

(57) ABSTRACT

A scanner includes the following features. A first driven roller sandwiches a document together with a first drive roller and is capable of rotating in a driven manner. A second driven roller sandwiches a document together with a second drive roller and is capable of rotating in a driven manner. A driving unit rotationally drives the first drive roller and the second drive roller. A transmission unit transmits a rotational force from one of the first driven roller and the second driven roller to another of the first driven roller and the second driven roller.

18 Claims, 18 Drawing Sheets

IMAGE READING APPARATUS TO SUPPRESS SKEWING OF MEDIUM

The present application is based on, and claims priority from JP Application Serial Number 2022-027688, filed Feb. 25, 2022, the disclosure of which is hereby incorporated by reference herein in its entirety.

BACKGROUND

1. Technical Field

The present disclosure relates to an image reading apparatus.

2. Related Art

An image reading apparatus disclosed in JP-A-2019-97057 includes two drive rollers, two driven rollers, and one driving unit. The two drive rollers are driven under the same drive condition by the driving unit and a coupling gear. The two driven rollers are rotated by rotation of the two drive rollers.

In a configuration in which a medium to be transported is read as in JP-A-2019-97057, when a thickness of the medium is changed, there is a concern that a transport failure of the medium may occur due to a change in a transport force acting on the medium.

SUMMARY

An image reading apparatus according to the present disclosure for solving the above problems includes a reading unit configured to read a medium, a first drive roller configured to be rotationally driven to transport the medium toward the reading unit, a first driven roller configured to sandwich, together with the first drive roller, the medium, and configured to rotate in a driven manner, a second drive roller configured to be rotationally driven to transport the medium downstream in a transport direction from the reading unit, a second driven roller configured to sandwich, together with the second drive roller, the medium, and configured to rotate in a driven manner, a driving unit configured to rotationally drive the first drive roller and the second drive roller, and a transmission unit configured to transmit a rotational force from one of the first driven roller and the second driven roller to another of the first driven roller and the second driven roller.

DESCRIPTION OF EXEMPLARY EMBODIMENTS

Figure 1:
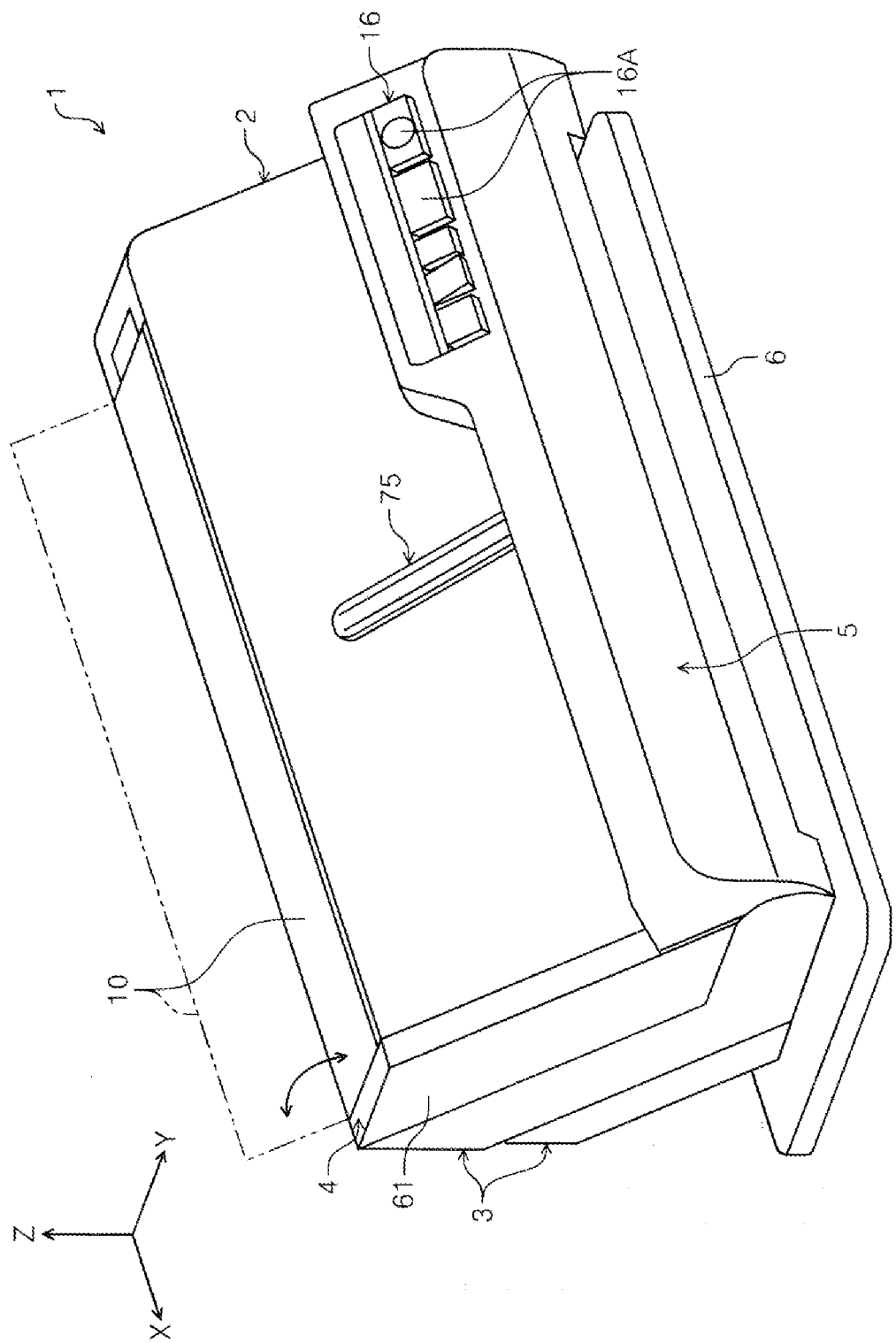
FIG. 1 is a front perspective view of a scanner according to a first exemplary embodiment in a state in which an apparatus main body is in a normal reading posture.

Hereinafter, the present disclosure will be schematically described.

An image reading apparatus according to a first aspect includes a reading unit configured to read a medium, a first drive roller configured to be rotationally driven to transport the medium toward the reading unit, a first driven roller configured to sandwich, together with the first drive roller, the medium, and configured to rotate in a driven manner, a second drive roller configured to be rotationally driven to transport the medium downstream in a transport direction from the reading unit, a second driven roller configured to sandwich, together with the second drive roller, the medium, and configured to rotate in a driven manner, a driving unit configured to rotationally drive the first drive roller and the second drive roller, and a transmission unit configured to transmit a rotational force from one of the first driven roller and the second driven roller to another of the first driven roller and the second driven roller.

When the first drive roller is rotated by driving of the driving unit, the first driven roller rotates in a driven manner. The medium sandwiched between the first drive roller and the first driven roller is transported toward the reading unit. At this time, in the first driven roller, since a driving force of the first drive roller is not directly transmitted due to the medium being interposed, there is a possibility that a transport force of the medium will decrease. In particular, when the thickness of the medium is changed from a thin thickness to a thick thickness, there is a possibility that the decrease in the transport force of the medium by the first driven roller becomes significant.

According to the present aspect, the second drive roller is rotated by the driving of the driving unit, and thus the second driven roller rotates in a driven manner. At the start of the transport of the medium by the first drive roller and the first driven roller, the second drive roller and the second driven roller do not sandwich the medium, and thus the driving force of the second drive roller is directly transmitted to the second driven roller.

Here, the transmission unit transmits a rotational force from the second driven roller to the first driven roller. Accordingly, since the transport force of the medium in the first driven roller increases, it is possible to suppress a transport failure of the medium by the first drive roller and the first driven roller.

Further, when the medium is separated from the first drive roller and the first driven roller and is transported by the second drive roller and the second driven roller, the driving force of the first drive roller is directly transmitted to the first driven roller. The transmission unit transmits the rotational force from the first driven roller to the second driven roller. Accordingly, since the transport force of the medium in the second driven roller increases, it is possible to suppress the transport failure of the medium by the second drive roller and the second driven roller.

According to a second aspect, in the image reading apparatus according to the first aspect, a part of the transmission unit overlaps a part of the reading unit when viewed in a width direction intersecting the transport direction of the medium.

In the present aspect, since the reading unit and the transmission unit are not disposed to be separated from each other in a intersecting direction intersecting with both the transport direction and the width direction, it is possible to reduce a size of the image reading apparatus in the intersecting direction.

According to a third aspect, in the image reading apparatus according to the first aspect or the second aspect, a part of the driving unit overlaps another part of the reading unit when viewed in a width direction intersecting the transport direction of the medium.

In the present aspect, since the reading unit and the driving unit are not disposed to be deviated from each other in the intersecting direction intersecting with both the transport direction and the width direction, it is possible to reduce the size of the image reading apparatus in the intersecting direction.

According to a fourth aspect, in the image reading apparatus according to any one of the first to third aspects, the transmission unit includes a transmission belt configured to transmit a rotational force.

In the present aspect, since the rotational force can be transmitted using one transmission belt, it is possible to reduce a number of components to be used and to suppress an increase in the size of the image reading apparatus, compared to a configuration in which one large gear or a plurality of gears are used as the transmission unit.

According to a fifth aspect, in the image reading apparatus according to any one of the first to fourth aspects, the driving unit includes a driving belt configured to transmit a driving force from one of the first drive roller and the second drive roller to another of the first drive roller and the second drive roller.

According to the present aspect, since the driving force can be transmitted using one driving belt, it is possible to reduce the number of components to be used and to suppress an increase in the size of the image reading apparatus, compared to a configuration in which one large gear or a plurality of gears are used as the driving unit.

According to a sixth aspect, in the image reading apparatus according to any one of the first to fifth aspects, the first driven roller includes a first friction portion configured to generate a first frictional force when the first friction portion comes into contact with the first drive roller, and the transmission unit is configured to transmit the first frictional force to the second driven roller when the second drive roller and the second driven roller sandwich the medium. According to the present aspect, since the first frictional force generated by the contact between the first friction portion and the first drive roller is transmitted to the second driven roller by the transmission unit, it is possible to increase the transport force of the medium of the second driven roller, compared to a configuration in which the first friction portion is not provided.

According to a seventh aspect, in the image reading apparatus according to any one of the first to sixth aspects, the second driven roller includes a second friction portion configured to generate a second frictional force when the second friction portion comes into contact with the second drive roller, and the transmission unit is configured to transmit the second frictional force to the first driven roller when the first drive roller and the first driven roller sandwich the medium. According to the present aspect, since the second frictional force generated by the contact between the second friction portion and the second drive roller is transmitted to the first driven roller by the transmission unit, it is possible to increase the transport force of the medium of the first driven roller, compared to a configuration in which the second friction portion is not provided.

According to an eighth aspect, in the image reading apparatus according to any one of the first to seventh aspects, when viewed in a width direction intersecting the transport direction of the medium, the transmission unit is located on one side with respect to a transport path of the medium, and the driving unit is located on another side with respect to the transport path.

In the present aspect, since the transmission unit and the driving unit are not aligned in the width direction, it is possible to suppress an increase in the size of the image reading apparatus in the width direction.

According to a ninth aspect, the image reading apparatus according to any one of the first to eighth aspects includes a placement unit at which the medium is placed, the placement unit being located upstream from the first drive roller and the first driven roller in the transport direction, an edge guide provided, at the placement unit, movably in a width direction intersecting the transport direction of the medium, the edge guide being configured to come into contact with an end portion of the medium in the width direction, a third drive roller rotatably provided at the placement unit, and a third driven roller rotatably provided at the edge guide and configured to transport the medium in association with rotation of the third drive roller.

In the present aspect, by moving the edge guide in accordance with the size of the medium in the width direction, the positional deviation of the medium in the width direction is suppressed. In addition, since the medium can be located between the third drive roller and the third driven roller, the medium is prevented from floating in the thickness direction of the medium. In addition, since the third drive roller and the third driven roller are rotated, a load acting on the medium from the third drive roller and the third driven roller is suppressed compared to a configuration in which the third drive roller and the third driven roller do not rotate. By these actions, it is possible to stabilize the posture and the transport state of the medium transported in the transport direction.

According to a tenth aspect, in the image reading apparatus according to the ninth aspect, the third drive roller is a magnet roller configured to generate a magnetic force, and the third driven roller is configured to rotate by receiving the magnetic force in association with rotation of the magnet roller.

According to the present aspect, the medium is pressed toward the placement unit by the weight of the third driven roller. The third driven roller is rotated by receiving the magnetic force in association with rotation of the magnet roller. With this configuration, the rotation of the magnet roller and the rotation of the third driven roller can be synchronized with each other, and the third driven roller can be prevented from slipping with respect to the medium to be transported.

According to an eleventh aspect, the image reading apparatus according to any one of the first to tenth aspects includes a placement unit at which the medium is placed, the placement unit being located upstream from the first drive roller and the first driven roller in the transport direction, and a static electricity generation unit provided at the placement unit and configured to generate an electrostatic force for attracting the medium toward the placement unit.

In the present aspect, the medium is attracted to the placement unit by the electrostatic force generated by the static electricity generation unit. Accordingly, since the posture of the medium is stabilized, it is possible to make it easy for the medium to enter between the first drive roller and the first driven roller.

According to a twelfth aspect, the image reading apparatus according to any one of the first to eleventh aspects includes a feeding roller rotatably provided upstream from the first drive roller and the first driven roller in the transport direction and configured to feed the medium downstream in the transport direction, and a separation roller configured to separate, one by one, the media fed by the feeding roller, wherein the separation roller includes a plurality of contact portions provided at intervals in a width direction intersecting the transport direction of the medium, and at least two of the plurality of contact portions being in contact with the medium.

According to the present aspect, since the plurality of contact portions are provided at intervals in the width direction, even when the medium is disposed to be deviated in the width direction, at least two of the plurality of contact portions can be brought into contact with the medium.

Accordingly, the medium is less likely to be rotated about the contact portion, and thus it is possible to suppress skewing of the medium in a direction intersecting the transport direction.

First Exemplary Embodiment

Hereinafter, the present disclosure will be specifically described.

As illustrated in FIG. 1, a scanner 1 which is an example of an image reading apparatus will be described. In FIG. 1, the scanner 1 is in a normal reading posture, which will be described below.

The scanner 1 is a so-called sheet feed type scanner that reads a document G (FIG. 2) while moving the document G with respect to a reading unit 40 (FIG. 2) to be described below. The document G is an example of a medium. The document G includes not only a sheet but also a receipt, a card, a booklet, etc.

The scanner 1 includes an apparatus main body 2 and a stand 6. The apparatus main body 2 includes a first unit 3, a second unit 4, and a third unit 5.

In the X-Y-Z coordinate system illustrated in each figure, the X-axis direction is an example of an apparatus width direction, a width direction of the document G, and a horizontal direction. The Y-axis direction is an apparatus depth direction. The Z-axis direction is an example of a vertical direction and an apparatus height direction. The Z-axis direction intersects with an A-axis direction described below.

In the present exemplary embodiment, the +Y direction is a direction from a rear surface to a front surface of the apparatus, and the −Y direction is a direction from the front surface to the rear surface of the apparatus. That is, with respect to the center of the scanner 1, the +Y direction is the front side, and the −Y direction is the back side. A left direction and a right direction as viewed from the front of the apparatus are defined as the +X direction and the −X direction, respectively. Further, an upper side in the Z-axis direction is defined as the +Z direction, and a lower side is defined as the −Z direction.

Figure 2:
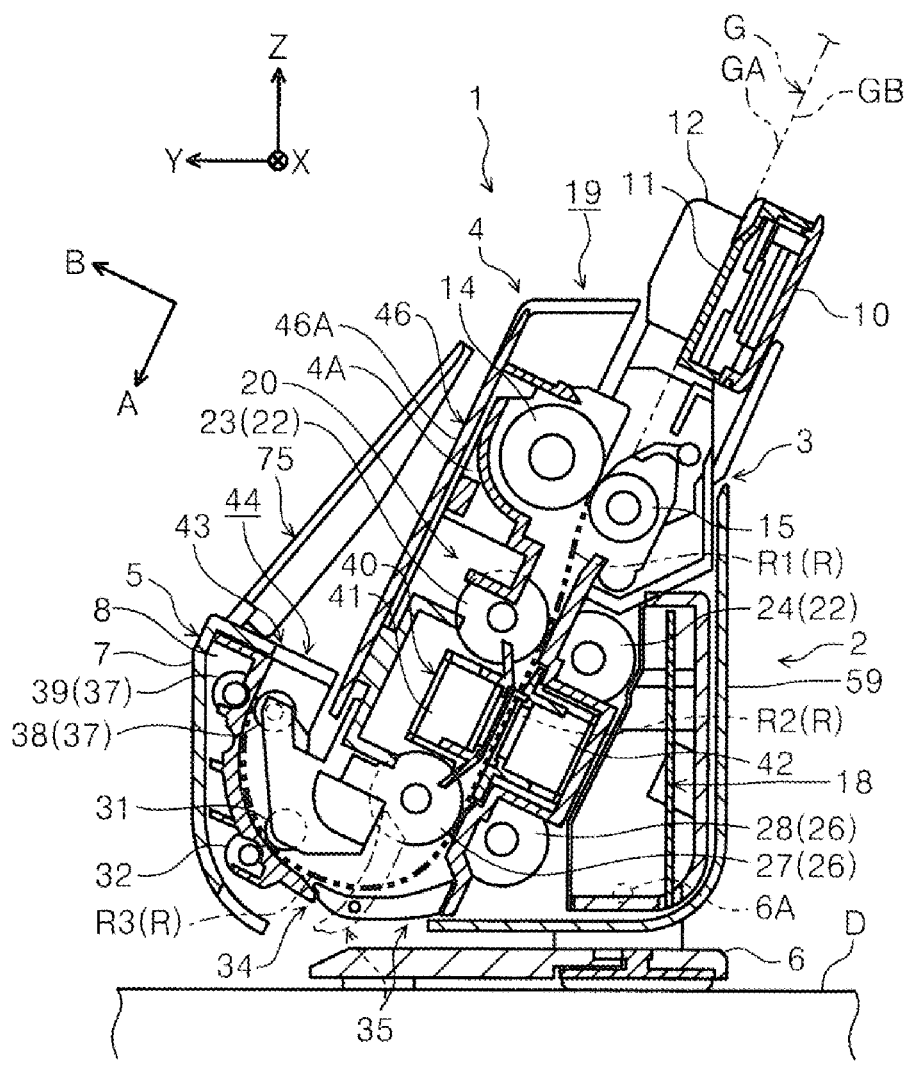
FIG. 2 is a cross-sectional view of the scanner according to the first exemplary embodiment when viewed from one side in a width direction in a state in which the apparatus main body is in the normal reading posture.
Figure 3:
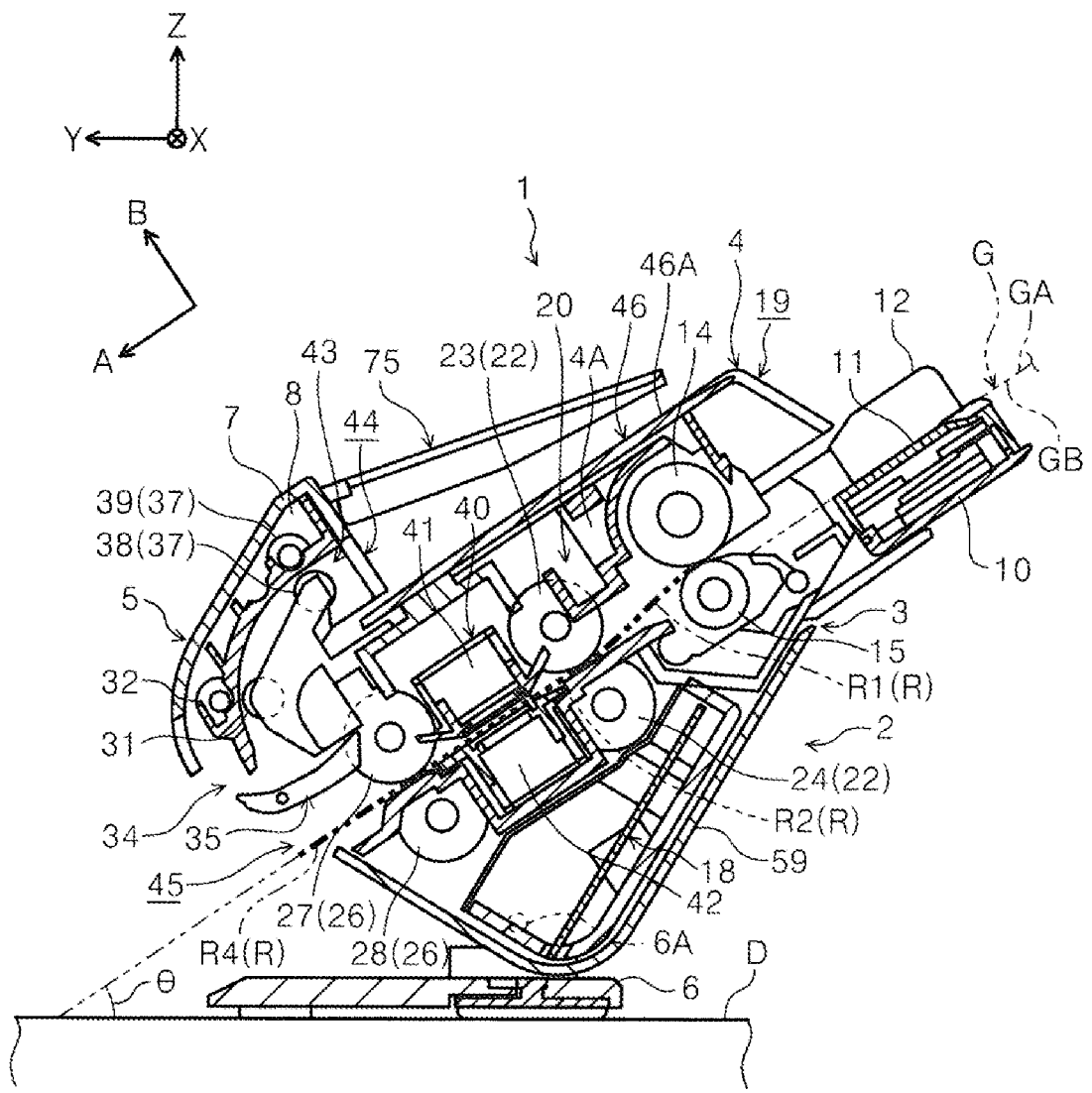
FIG. 3 is a cross-sectional view of the scanner according to the first exemplary embodiment when viewed from one side in the width direction in a state in which the apparatus main body is in a booklet reading posture.

As illustrated in FIGS. 2 and 3, the scanner 1 can switch its posture from the normal reading posture (FIG. 2) to a booklet reading posture (FIG. 3) in which the scanner 1 is tilted. To be specific, the apparatus main body 2 is tilted with respect to the stand 6 by operation of a switching motor 48 (FIG. 5) to be described below. A surface at which the stand 6 is placed is defined as an installation surfaced. The installation surfaced is an example of a horizontal surface along the X-Y plane.

The scanner 1 can read at least one of a front surface GA of the document G and a back surface GB opposite to the front surface GA. A path through which the document G is transported in the scanner 1 is referred to as a transport path R. Hereinafter, a direction in which the transport path R extends at a position facing the reading unit 40 to be described below is referred to as the A-axis direction. In the A-axis direction, a direction in which the document G is transported is defined as a +A direction. That is, the +A direction is an example of the transport direction. In the A-axis direction, a direction in which the document G is discharged in the normal reading posture, which will be described below, is defined as a −A direction. The −A direction is an example of a discharge direction.

The A-axis direction is orthogonal to the X-axis direction. The +A direction is a direction toward a position in the +Y direction and the −Z direction. A direction orthogonal to both the A-axis direction and the X-axis direction is defined as a B-axis direction.

The B-axis direction is an example of a stacking direction of the document G in a document support portion 46 described below. Further, the B-axis direction is an example of a facing direction in which the reading unit 40 and the reading path R2 described below face each other. Further, the B-axis direction is an example of an intersecting direction intersecting the +A direction and the X-axis direction. In the B-axis direction, a direction having a component in the +Z direction is defined as a +B direction, and a direction having a component in the −Z direction is defined as a −B direction.

The stand 6 rotatably supports the apparatus main body 2.

The apparatus main body 2 includes, for example, a transport unit 20 that transports the document G along the transport path R, the reading unit 40 that faces the transport path R and reads an image of the document G, a driving unit 50 (FIG. 6) that drives the transport unit 20, and a transmission unit 70 (FIG. 6) that transmits a rotational force.

In addition to the transport unit 20 and the reading unit 40, the apparatus main body 2 includes a reversing unit 34, a discharge roller pair 37, the document support portion 46, and a pressing member 75. The pressing member 75 presses the discharged document G against the document support portion 46.

The first unit 3 is configured to include an upper opening/closing unit 10, a separation roller 15, a first driven roller 24, a second driven roller 28, a second reading unit 42, a control unit 18, a switching motor 48, a transport motor 52 (FIG. 5), and a cover member 59.

The second unit 4 is located in the +Y direction with respect to the first unit 3. The second unit 4 is configured to include a main body frame 4A, a feeding roller 14, a first drive roller 23, a second drive roller 27, a first reading unit 41, a switching flap 35, an upper roller 31, a first discharge roller 38, a document support portion 46, and a cover member 61 (FIG. 1).

The document support portion 46 constitutes a side portion in the +Y direction of the second unit 4 in the normal reading posture. The document support portion 46 is a portion at which the document G discharged by the discharge roller pair 37 described below is supported. A support surface 46A which is a part of the document support portion 46 and at which the document G is supported is, for example, a plane along the X-A plane.

The third unit 5 is located in the +Y direction with respect to the second unit 4. The third unit 5 includes a cover member 7, a frame 8, an operation unit 16 (FIG. 1), a lower roller 32, a second discharge roller 39, and a pressing member 75. The first discharge roller 38 and the second discharge roller 39 are collectively referred to as the discharge roller pair 37. The upper roller 31 and the lower roller 32 are located upstream from the discharge roller pair 37.

Figure 4:
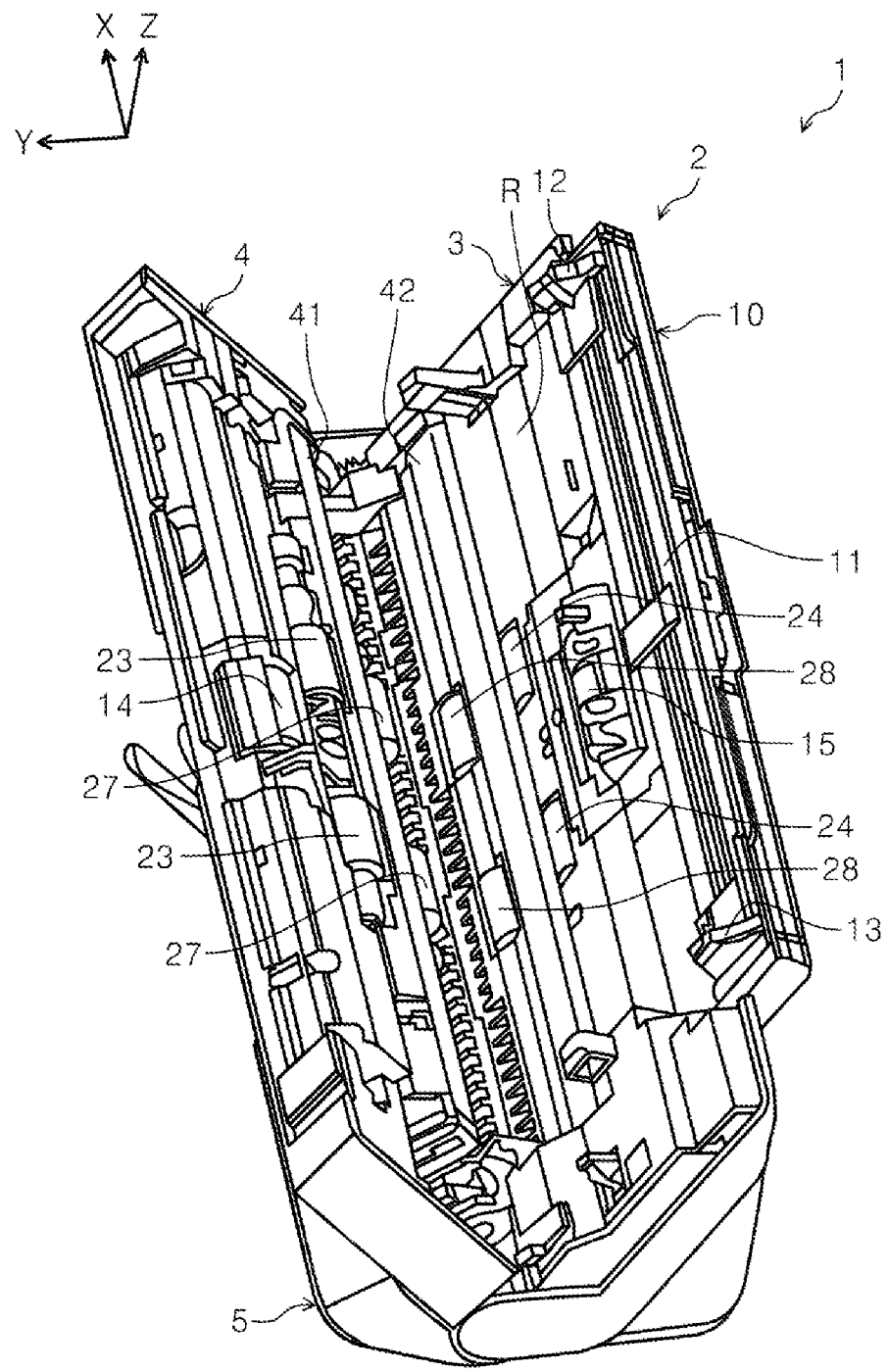
FIG. 4 is a perspective view illustrating a state in which a second unit is exposed with respect to a first unit in the scanner according to the first exemplary embodiment.

As illustrated in FIG. 4, the second unit 4 and the third unit 5 are integrally rotatable with respect to the first unit 3 about a frame rotation axis (not illustrated) extending in the X direction. By rotating the second unit 4 and the third unit 5 with respect to the first unit 3, the transport path R to be described below is exposed.

The third unit 5 can be rotated about the frame rotation axis with respect to the first unit 3 and the second unit 4. By rotating the third unit 5 with respect to the first unit 3 and the second unit 4, it is possible to expose a reverse path R3 (FIG. 2) which will be described below.

Figure 5:
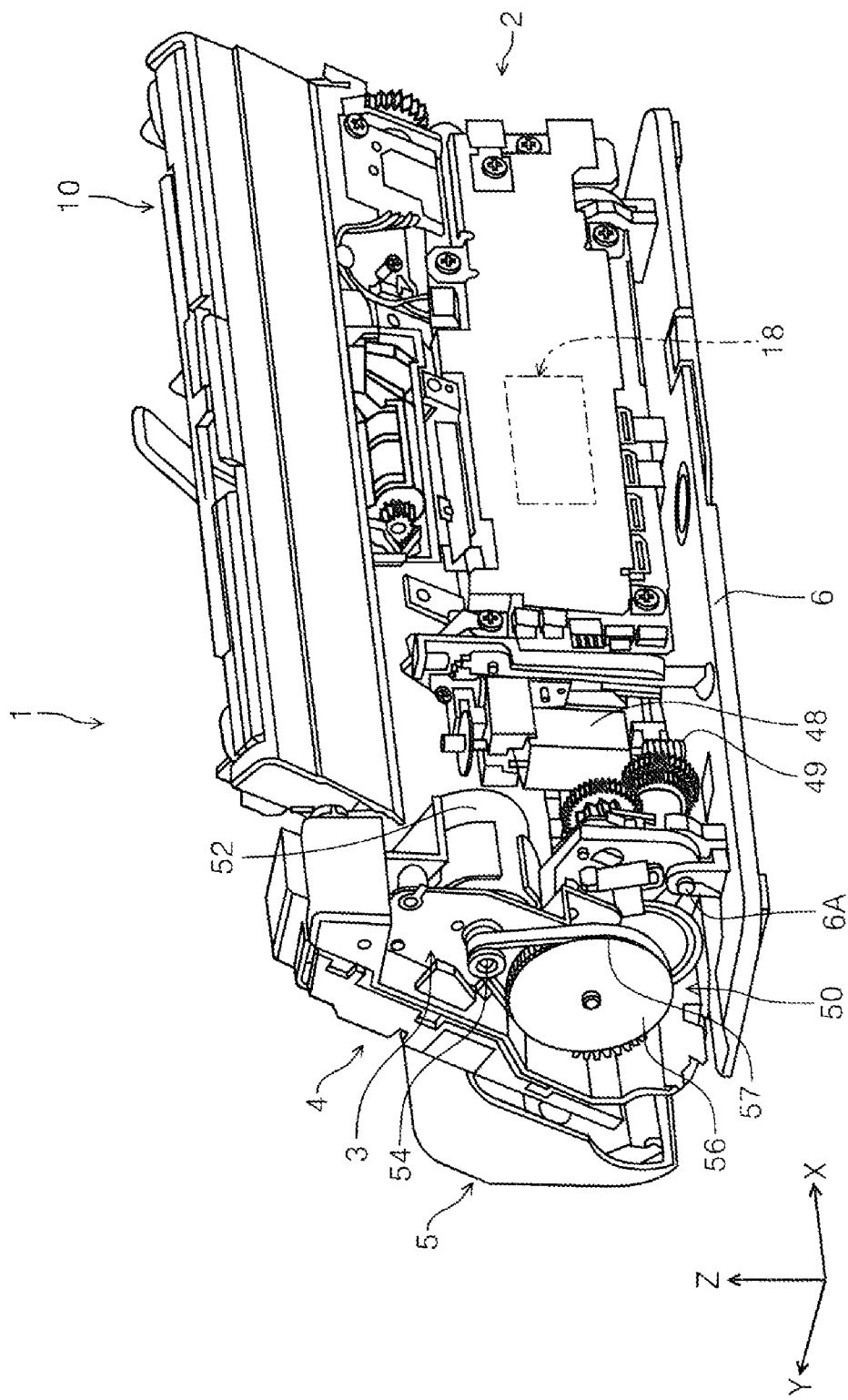
FIG. 5 is a rear perspective view of the scanner according to the first exemplary embodiment in a state in which the apparatus main body is in the normal reading posture.

As illustrated in FIG. 2, the apparatus main body 2 is rotatable about a main body rotation axis 6A with respect to the stand 6. In the present exemplary embodiment, the apparatus main body 2 can be held in two postures by being rotated. The posture of the apparatus main body 2 illustrated in FIG. 2 is referred to as the normal reading posture. The posture of the apparatus main body 2 illustrated in FIG. 3 is referred to as the booklet reading posture. Switching of the posture of the apparatus main body 2 is performed by the switching motor 48 (FIG. 5). In the present specification, the normal reading posture or the booklet reading posture means the posture of the apparatus main body 2. In some cases, the normal reading posture or the booklet reading posture may be referred to as the posture of the scanner 1.

The transport path R includes, for example, a document feeding path R1, the reading path R2, the reverse path R3, and a non-reverse transport path R4 (FIG. 3). Since the reverse path R3 and the non-reverse transport path R4 are switched, the reverse path R3 and the non-reverse transport path R4 do not constitute a path at the same time. In the scanner 1, the reverse path R3 is formed in the normal reading posture. The non-reverse transport path R4 is formed in the booklet reading posture.

The document feed path R1 is a path from a nip position between the feeding roller 14 and the separation roller 15 to a nip of the first transport roller pair 22.

The reading path R2 is a path facing the reading unit 40, which will be described below. The reading path R2 is a linear path extending from the nip of the first transport roller pair 22 to the nip of the second transport roller pair 26 via a position facing the reading unit 40. The reading path R2 extends along the A-axis direction.

The reverse path R3 is a path located downstream from the reading path R2 when the apparatus main body 2 is in the normal reading posture. The document G after being read is reversed in the +Z direction in the reversing path R3 and is discharged obliquely upward from a first discharge port 44. The upper roller 31, the lower roller 32, and a discharge unit 43 are located in the reverse path R3. A portion constituting the reversing path R3 is the reversing unit 34. The reversing unit 34 is a portion where one of the front surface GA and the back surface GB, which are front and back surfaces of the document G read by the reading unit 40, is reversed to the other.

The non-reverse transport path R4 is a path located downstream from the reading path R2 when the apparatus main body 2 is in the booklet reading posture. The document G after being read is not reversed in the non-reverse transport path R4, and is discharged obliquely downward from a second discharge port 45 (FIG. 3). The second transport roller pair 26 functions as a roller pair that discharges the document G from the non-reverse transport path R4.

The switching flap 35 is located downstream in the +A direction with respect to the second transport roller pair 26. The switching flap 35 is rotated by a solenoid (not illustrated) to enable transport of the document G in one of the reverse path R3 and the non-reverse transport path R4 and restrict transport of the document G to the other path. In other words, the switching flap 35 performs switching between the reverse path R3 and the non-reverse transport path R4. In the present exemplary embodiment, the switching flap 35 is configured to rotate in conjunction with switching of the posture of the apparatus main body 2.

The discharge roller pair 37 discharges the document G reversed in the reversing unit 34 from the first discharge port 44 in the −A direction. The second transport roller pair 26 is rotationally driven by the driving unit 50 (FIG. 6), which will be described below, to discharge the document G from the second discharge port 45.

As illustrated in FIG. 3, an angle formed by an extended line of the reading path R2 and the installation surfaced is defined as an attitude angle θ [°]. The posture angle θ in the case of the booklet reading posture is smaller than the posture angle θ in the case of the normal reading posture.

In the scanner 1, a projected area of the apparatus main body 2 on the installation surfaced is the smallest in the normal reading posture. That is, in the normal reading posture, a footprint of the apparatus main body 2 is the smallest. The footprint of the scanner 1 in the present specification corresponds to an occupied area in the X-Y plane of the scanner 1 when the scanner 1 is viewed in the −Z direction from above in the Z-axis direction.

As illustrated in FIG. 1, the operation unit 16 includes a plurality of operation buttons 16A. The operation unit 16 can transmit and receive a signal to and from the control unit 18 (FIG. 2). Functions such as an ON/OFF switch of a power supply of the scanner 1 are assigned to the plurality of operation buttons 16A.

As illustrated in FIG. 2, the first unit 3 includes the upper opening/closing unit 10 that functions as a lid of the transport path R. In the first unit 3 and the second unit 4, a feed port 19 is provided at a portion located at the most upstream end of the transport path R.

The upper opening/closing unit 10 is rotated about a shaft (not illustrated) to open and close the feed port 19. In the present exemplary embodiment, "feeding" means an initial stage of transport and is included in "transport". When the upper opening/closing unit 10 is in the open position, a placement unit 11 is formed. The document G to be fed is supported in an inclined posture by the placement unit 11.

The placement unit 11 is a portion at which a part of the document G before being transported is placed in the first unit 3. The placement unit 11 is provided with an edge guide 12 and an edge guide 13 (FIG. 4). The edge guides 12 and 13 are provided, at the placement unit 11, movably in the X-axis direction. To be specific, the edge guides 12 and 13 are disposed at an interval in the X-axis direction. The edge guides 12 and 13 are configured to be movable toward each other or away from each other along the X-axis direction by a mechanism including a rack and a pinion (not illustrated). The edge guides 12 and 13 align both end portions in the X-axis direction of a plurality of the documents G stacked on the placement unit 11. In the scanner 1, the documents G are fed by a center feeding method.

The feeding roller 14 rotates by obtaining a driving force from the transport motor 52 (FIG. 5) which will be described below. The feeding roller 14 feeds the document G to the first transport roller pair 22.

The separation roller 15 is provided at a position facing the feeding roller 14 in the first unit 3. A rotational torque is applied to the separation roller 15 by a torque limiter (not illustrated), and the separation roller 15 suppresses double feeding of the document G. The feeding roller 14 and the separation roller 15 are provided at a central position in the X-axis direction.

When the plurality of documents G are placed at the placement unit 11, the separation roller 15 separates the uppermost document G from the other documents G. Then, the uppermost document G is fed downstream in the +A direction by the feeding roller 14.

The transport unit 20 is provided downstream from the feeding roller 14 and the separation roller 15.

The transport unit 20 includes, for example, the first transport roller pair 22, the second transport roller pair 26, the upper roller 31, and the lower roller 32.

The first transport roller pair 22 includes the first drive roller 23 and the first driven roller 24. The first transport roller pair 22 is located upstream in the +A direction with respect to the reading unit 40 in the transport path R.

The second transport roller pair 26 includes the second drive roller 27 and the second driven roller 28. The second transport roller pair 26 is located downstream in the +A direction with respect to the reading unit 40 in the transport path R.

The first drive roller 23 is located in the +B direction with respect to the transport path R. The first drive roller 23 is provided at the main body frame 4A to be rotatable about a shaft along the X-axis direction. The first drive roller 23 is provided to be capable of advancing and retreating in the B axis direction with respect to the first driven roller 24. The first drive roller 23 is rotated by a power obtained from the transport motor 52 (FIG. 5) to be described below. That is, the first drive roller 23 is rotationally driven to transport the document G toward the reading unit 40.

The first driven roller 24 is located in the −B direction with respect to the transport path R. The first driven roller 24 is provided at the first unit 3 to be rotatable about an axis along the X-axis direction. The first driven roller 24 is a roller that sandwiches the document G together with the first drive roller 23 and is capable of rotating in a driven manner.

The second drive roller 27 is located in the +B direction with respect to the transport path R. The second drive roller 27 is provided at the main body frame 4A so as to be rotatable about a shaft along the X-axis direction. The second drive roller 27 is provided to be capable of advancing and retreating in the B-axis direction with respect to the second driven roller 28. The second drive roller 27 is rotated by a power obtained from the transport motor 52. That is, the second drive roller 27 is rotationally driven to transport the document G to the downstream in the +A direction from the reading unit 40.

The second driven roller 28 is located in the −B direction with respect to the transport path R. The second driven roller 28 is provided at the first unit 3 to be rotatable about an axis along the X-axis direction. The second driven roller 28 is a roller that sandwiches the document G together with the second drive roller 27 and is capable of rotating in a driven manner.

When the second unit 4 is closed with respect to the first unit 3, the first drive roller 23 and the first driven roller 24 come into contact with each other to form a nip. The second drive roller 27 and the second driven roller 28 are in contact with each other to form a nip.

When the second unit 4 is exposed with respect to the first unit 3, the first drive roller 23 is separated from the first driven roller 24. In addition, the second drive roller 27 is separated from the second driven roller 28.

Figure 7:
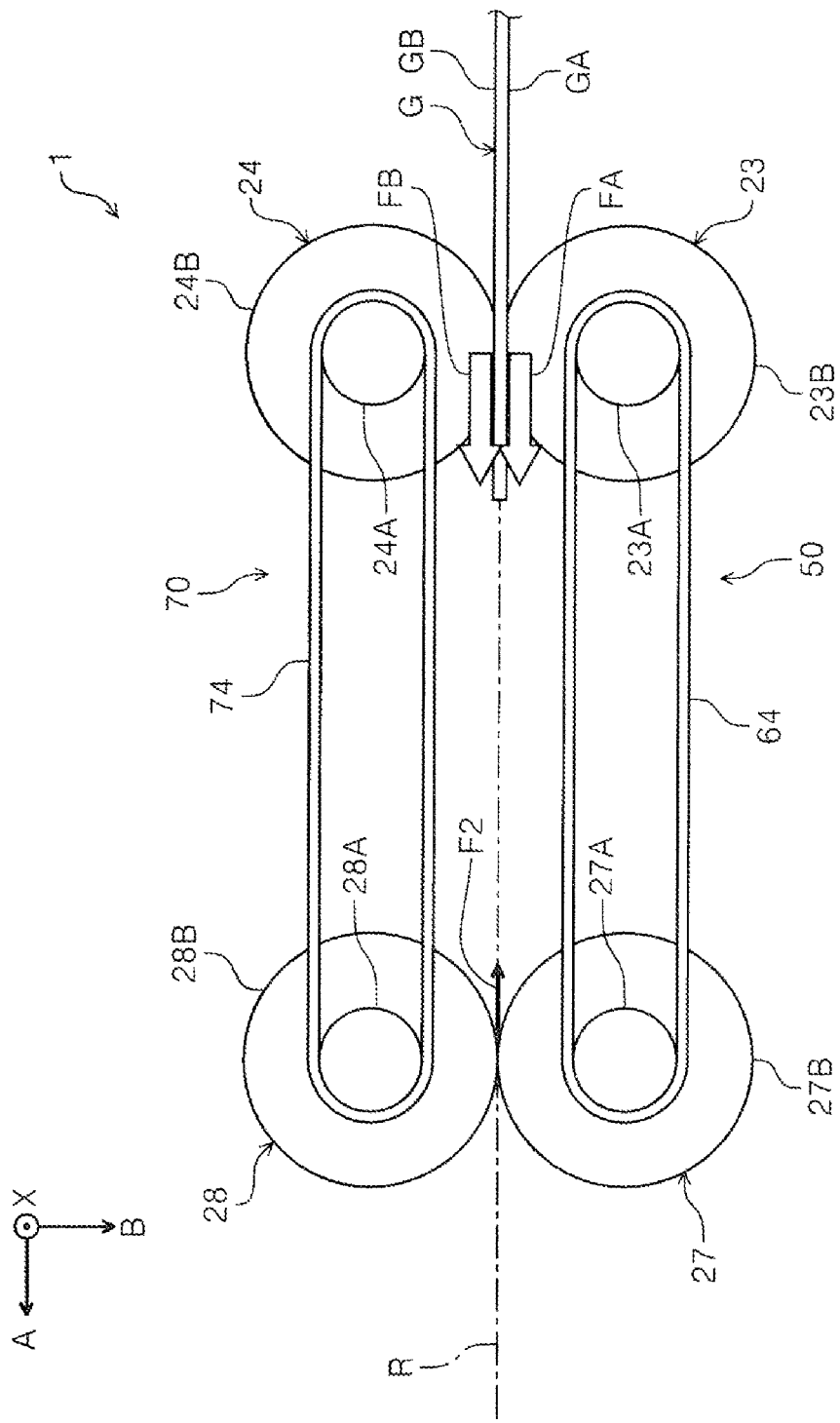
FIG. 7 is a schematic view illustrating a state in which a first transport roller pair transports a document and a second transport roller pair does not transport the document in the scanner according to the first exemplary embodiment.

As illustrated in FIG. 7, the first drive roller 23 includes, for example, a cylindrical shaft portion 23A and a cylindrical outer peripheral portion 23B. The shaft portion 23A extends in the X-axis direction. Both end portions of the shaft portion 23A in the X-axis direction are rotatably supported by the apparatus main body 2 (FIG. 2).

The outer peripheral portion 23B is a portion where a friction force is generated by contact with the first driven roller 24. The outer peripheral portion 23B is made of rubber, for example. The material of the outer peripheral portion 23B is not limited to rubber, and may be resins or metals having relatively high surface roughness.

In the following description, a magnitude of the transport force of the document G corresponds to a magnitude of a reaction force acting on a frictional force generated at a contact portion between a roller for transporting the document G and the document G.

The first driven roller 24 includes, for example, a cylindrical shaft portion 24A and a cylindrical first friction portion 24B. The shaft portion 24A extends in the X-axis direction. Both end portions of the shaft portion 24A in the X-axis direction are rotatably supported by the apparatus main body 2.

The first friction portion 24B is a portion where a first friction force F1 (FIG. 9) is generated by contact with the first drive roller 23. The first friction portion 24B is made of rubber, for example. The material of the first friction portion 24B is not limited to rubber, and may be resins or metals having relatively high surface roughness.

The outer diameter and material of the first friction portion 24B and the outer peripheral portion 23B may be the same or different.

The second drive roller 27 includes, for example, a cylindrical shaft portion 27A and a cylindrical outer peripheral portion 27B. The shaft portion 27A extends in the X-axis direction. Both end portions of the shaft portion 27A in the X-axis direction are rotatably supported by the apparatus main body 2.

The outer peripheral portion 27B is a portion where a friction force is generated by contact with the second driven roller 28. The outer peripheral portion 27B is made of rubber, for example. The material of the outer peripheral portion 27B is not limited to rubber, and may be resins or metals having relatively high surface roughness.

The second driven roller 28 includes, for example, a cylindrical shaft portion 28A and a cylindrical second friction portion 28B. The shaft portion 28A extends in the X-axis direction. Both end portions of the shaft portion 28A in the X-axis direction are rotatably supported by the apparatus main body 2.

The second friction portion 28B is a portion where a second friction force F2 is generated by contact with the second drive roller 27. The second friction portion 28B is made of rubber, for example. The material of the second friction portion 28B is not limited to rubber, and may be resins or metals having relatively high surface roughness.

The outer diameter and material of the second friction portion 28B and the outer peripheral portion 27B may be the same or different.

As illustrated in FIG. 2, the reading unit 40 is provided downstream from the first transport roller pair 22 in the +A direction. The reading unit 40 includes the first reading unit 41 and the second reading unit 42 that face each other in the B-axis direction. In the present exemplary embodiment, each of the first reading unit 41 and the second reading unit 42 includes, for example, a contact image sensor module (CISM). The reading unit 40 reads the document G transported by the first transport roller pair 22.

The first reading unit 41 is provided at the second unit 4. The first reading unit 41 reads the front surface GA of the document G. The first reading unit 41 is provided to be movable in the B-axis direction.

The second reading unit 42 is provided at the first unit 3. The second reading unit 42 reads the back surface GB of the document G.

As an example, the first reading unit 41 and the second reading unit 42 are different in arrangement and orientation, but have the same structure. The second transport roller pair 26 is provided downstream from the reading unit 40 in the +A direction.

As illustrated in FIG. 5, the switching motor 48 is provided to be capable of switching the posture of the apparatus main body 2 with respect to the stand 6. The switching motor 48 applies a driving force to the apparatus main body 2 when the apparatus main body 2 is switched from one of the normal reading posture and the booklet reading posture to the other. The switching motor 48 includes a worm gear 49. The worm gear 49 is provided to be capable of transmitting a driving force to a gear that meshes with a tooth portion (not illustrated) of the stand 6. Accordingly, when the switching motor 48 drives the worm gear 49, the posture of the apparatus main body 2 with respect to the stand 6 is switched.

As an example, the control unit 18 is provided at the first unit 3. The control unit 18 performs various types of control of the scanner 1 including control of feeding, transporting, discharging, and reading of the document G. The control unit 18 is configured to receive a signal from the operation unit 16 (FIG. 1). The control unit 18 controls operation of the switching motor 48 and the transport motor 52 to be described below. In the present exemplary embodiment, each motor is, for example, a DC motor.

Signals from a placement detection unit, a double-feed detection unit, a document detection unit, a posture detection sensor, etc. (not illustrated) are also input to the control unit 18.

The control unit 18 grasps a rotation direction and a rotation amount of the switching motor 48 based on information obtained from a detection unit (not illustrated). That is, the control unit 18 determines whether the posture of the apparatus main body 2 is the normal reading posture or the booklet reading posture.

Figure 6:
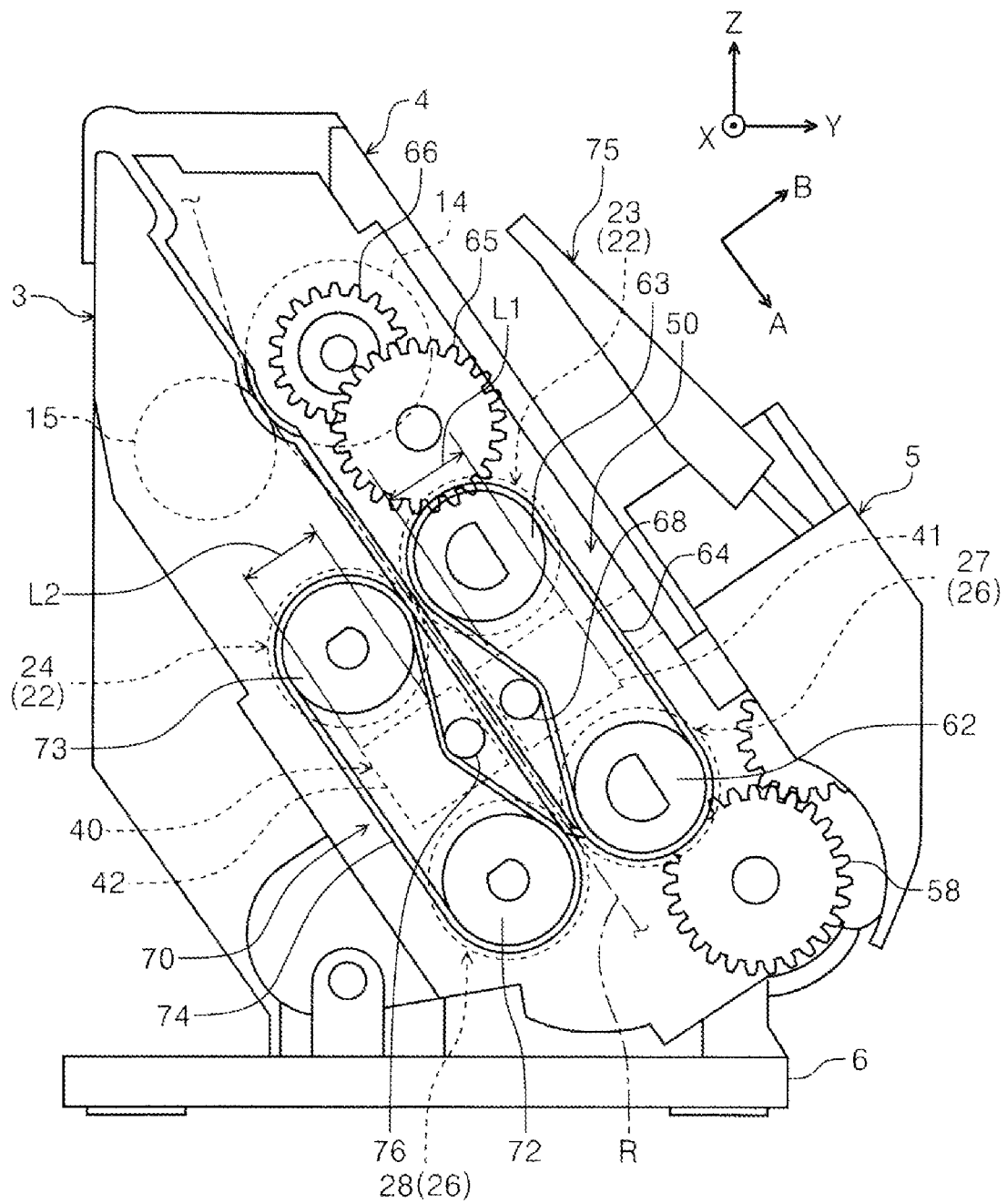
FIG. 6 is a side view of the inside of the scanner according to the first exemplary embodiment when viewed from the other side in the width direction in a state in which the apparatus main body is in the normal reading posture.

As illustrated in FIGS. 5 and 6, the driving unit 50 includes, for example, the transport motor 52, a driving pulley 54, a driven pulley 56, a belt 57, an intermediate gear 58, a first pulley 62, a second pulley 63, a driving belt 64, a transmission gear 65, a gear 66, and a first pin 68. The driving unit 50 rotationally drives the first drive roller 23 and the second drive roller 27.

As illustrated in FIG. 5, the transport motor 52 rotationally drives the first transport roller pair 22, the second transport roller pair 26, and the lower roller 32 (FIG. 2). The transport motor 52 is provided at an end portion in the -X direction in the apparatus main body 2. The transport motor 52 rotates the drive pulley 54.

The belt 57 is wound around the driving pulley 54 and the driven pulley 56. Accordingly, the driving force of the transport motor 52 is transmitted from the driving pulley 54 to the driven pulley 56 via the belt 57. The driving force transmitted to the driven pulley 56 is transmitted to the intermediate gear 58 (FIG. 6).

As illustrated in FIG. 6, the intermediate gear 58 is rotatably provided at an end portion in the +X direction in a lower portion of the second unit 4 in the Z-axis direction. A tooth portion of the intermediate gear 58 meshes with a tooth portion (not illustrated) provided in the first pulley 62. Thus, the driving force can be transmitted from the intermediate gear 58 to the first pulley 62.

The first pulley 62 is attached to an end portion of the shaft portion 27A (FIG. 7) in the +X direction. The second pulley 63 is attached to an end portion of the shaft portion 23A (FIG. 7) in the +X direction.

The driving belt 64 is wound around the first pulley 62 and the second pulley 63. The driving belt 64 transmits the driving force from one of the first drive roller 23 and the second drive roller 27 to the other. To be specific, the driving belt 64 transmits the driving force from the second drive roller 27 to the first drive roller 23.

The second pulley 63 is provided with a tooth portion (not illustrated). This tooth portion meshes with a tooth portion (not illustrated) of the transmission gear 65. A tooth portion (not illustrated) of the transmission gear 65 meshes with a tooth portion of the gear 66.

The gear 66 is attached to an end portion in the +X direction of the shaft portion of the feeding roller 14. Accordingly, the driving force transmitted from the transport motor 52 to the intermediate gear 58 can be transmitted to the feeding roller 14 via the first pulley 62, the driving belt 64, the second pulley 63, the transmission gear 65, and the gear 66.

The first pin 68 applies tension to the driving belt 64 by contacting a part of the outer peripheral surface of the driving belt 64.

A part of the driving unit 50 overlaps another part of the reading unit 40 when viewed in the X-axis direction intersecting the transport direction of the document G. To be specific, the driving belt 64 overlaps the first reading unit 41 within a range of a length L1 in the B-axis direction when viewed in the X-axis direction.

In the present exemplary embodiment, the force transmitted by the driving unit 50 is referred to as a driving force, and a force transmitted by the transmission unit 70 is referred to as a rotational force, to distinguish these forces from each other.

The transmission unit 70 includes, for example, a third pulley 72, a fourth pulley 73, a transmission belt 74, and a second pin 76.

The third pulley 72 is attached to an end portion of the shaft portion 28A (FIG. 7) in the +X direction. The fourth pulley 73 is attached to an end portion of the shaft portion 24A (FIG. 7) in the +X direction. The transmission belt 74 is wound around the third pulley 72 and the fourth pulley 73.

The transmission unit 70 transmits the rotational force from one of the first driven roller 24 and the second driven roller 28 to the other. A part of the transmission unit 70 overlaps a part of the reading unit 40 when viewed in the X-axis direction. To be specific, the transmission belt 74 overlaps the second reading unit 42 within a range of a length L2 in the B-axis direction when viewed in the X-axis direction.

When viewed in the X-axis direction, the transmission unit 70 is located on one side with respect to the transport path R of the document G. The driving unit 50 is located on the other side of the transport path R. To be specific, the transmission unit 70 is located in the −B direction with respect to the transport path R. The driving unit 50 is located in the +B direction with respect to the transport path R.

Figure 9:
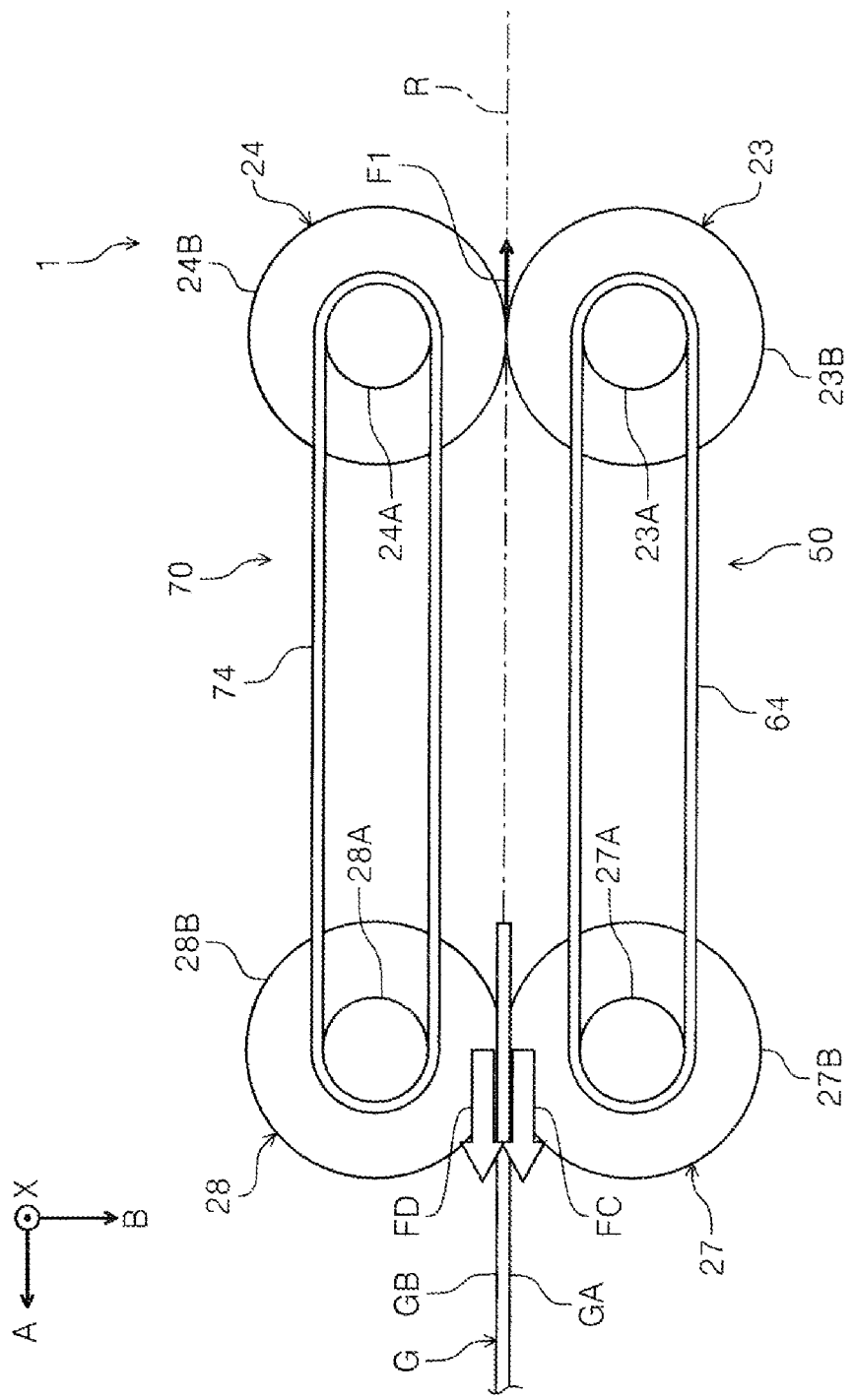
FIG. 9 is a schematic view illustrating a state in which the second transport roller pair transports the document and the first transport roller pair does not transport the document in the scanner according to the first exemplary embodiment.

As illustrated in FIG. 9, in a case where the second drive roller 27 and the second driven roller 28 sandwich the document G and where the first drive roller 23 and the first driven roller 24 do not sandwich the document G in the middle of the transport of the document G, the transmission unit 70 can transmit a counterforce to the first friction force F1 to the second driven roller 28 as the transport force.

As illustrated in FIG. 7, in a case where the first drive roller 23 and the first driven roller 24 sandwich the document G and where the second drive roller 27 and the second driven roller 28 do not sandwich the document G in the middle of the transport of the document G, the transmission unit 70 can transmit a counterforce to the second friction force F2 to the first driven roller 24 as the transport force.

Next, actions of the scanner 1 according to the first exemplary embodiment will be described.

As illustrated in FIG. 6, when the transport motor 52 (FIG. 5) is driven, the driving force transmitted from the intermediate gear 58 to the first pulley 62 is transmitted to the second pulley 63 via the driving belt 64. Accordingly, the first drive roller 23 and the second drive roller 27 are rotated. Further, the driving force is transmitted from the second pulley 63 to the feeding roller 14 via the transmission gear 65 and the gear 66. As a result, the feeding roller 14 is rotated to start feeding of the document G.

In a case where the rotation of the first drive roller 23 and the second drive roller 27 is started and where the document G does not reach the first transport roller pair 22, the first driven roller 24 and the second driven roller 28 rotates in a driven manner by the contact with the first drive roller 23 and the second drive roller 27. At this time, since there is no document G, no transport force is applied to the document G by the driving unit 50 and the transmission unit 70.

As illustrated in FIG. 7, at the time when the document G starts to enter between the first drive roller 23 and the first driven roller 24, the document G does not enter between the second drive roller 27 and the second driven roller 28.

Here, a force in the +A direction applied from the first drive roller 23 to the front surface GA of the document G is set as a transport force FA. In addition, a force in the +A direction applied from the first driven roller 24 to the back surface GB of the document G is set as a transport force FB.

The first drive roller 23 and the second drive roller 27 are driven in synchronization with each other.

On the other hand, the second friction force F2 acts on the second driven roller 28 by the rotation of the second drive roller 27. Then, the second driven roller 28 rotates together with the second drive roller 27 by receiving a counterforce to the second friction force F2 as a rotational force.

The rotational force received by the second driven roller 28 is directly transmitted to the first driven roller 24 via the transmission belt 74. That is, the first driven roller 24 functions as a drive roller which is driven by the second drive roller 27. Accordingly, the magnitude of the transport force FB is greater than the transport force in a case where the first driven roller 24 functions as a driven roller with respect to the first drive roller 23.

In this manner, by increasing the transport force FB, the sum of the transport force FA and the transport force FB acting on the document G can be increased. As a result, even when the document G is changed to a thick document that requires a relatively large transport force, the document G can be stably transported.

Figure 8:
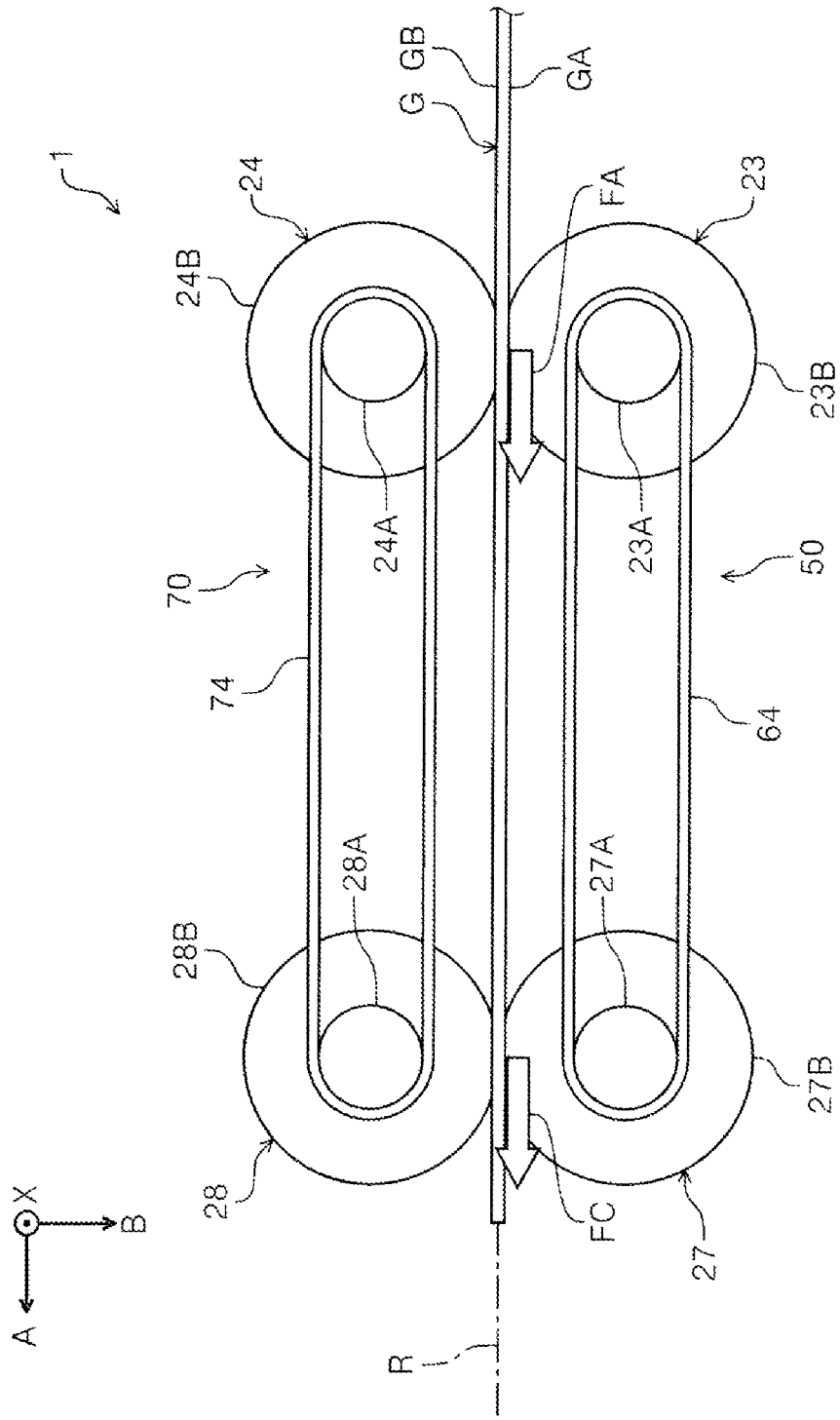
FIG. 8 is a schematic view illustrating a state in which the first transport roller pair and the second transport roller pair transport the document in the scanner according to the first exemplary embodiment.

As illustrated in FIG. 8, it is assumed that the document G enters between the first drive roller 23 and the first driven roller 24 and between the second drive roller 27 and the second driven roller 28. A force in the +A direction applied from the second drive roller 27 to the front surface GA of the document G is set as a transport force FC.

Here, due to the presence of the document G, the transmission of the driving force from the first drive roller 23 to the first driven roller 24 and the transmission of the driving force from the second drive roller 27 to the second driven roller 28 are blocked. Therefore, the sum of the transport force FA and the transport force FC acts on the document G.

As illustrated in FIG. 9, it is assumed that the document G is present between the second drive roller 27 and the second driven roller 28, and the document G does not enter between the first drive roller 23 and the first driven roller 24.

The force in the +A direction applied from the second driven roller 28 to the back surface GB of the document G is set as a transport force FD.

The first drive roller 23 and the second drive roller 27 are each driven. That is, the transport force FC acts on the front surface GA of the document G.

On the other hand, the first friction force F1 acts on the first driven roller 24 by the rotation of the first drive roller 23. Then, the first driven roller 24 rotates together with the first drive roller 23 by receiving a counterforce to the first friction force F1 as a rotational force.

The rotational force received by the first driven roller 24 is directly transmitted to the second driven roller 28 via the transmission belt 74. That is, the second driven roller 28 functions as a drive roller which is driven by the first drive roller 23. Accordingly, the magnitude of the transport force FD is greater than the transport force in a case where the second driven roller 28 functions as a driven roller with respect to the second drive roller 27.

In this manner, by increasing the transport force FD, the sum of the transport force FC and the transport force FD acting on the document G can be increased. As a result, even when the document G is changed to a thick document that requires a relatively large transport force, the document G can be stably transported.

As described above, when the first drive roller 23 is rotated by the driving of the driving unit 50, the first driven roller 24 rotates in a driven manner. Then, the document G sandwiched between the first drive roller 23 and the first driven roller 24 is transported toward the reading unit 40. At this time, in the first driven roller 24, since the driving force of the first drive roller 23 is not directly transmitted due to the presence of the document G, there is a possibility that the transport force of the document G decreases. In particular, when the thickness of the document G is changed from a thin thickness to a thick thickness, there is a possibility that the decrease in the transport force of the document G by the first driven roller 24 becomes significant.

According to the scanner 1, the second drive roller 27 is rotated by the driving of the driving unit 50, and thus the second driven roller 28 rotates in a driven manner. At the start of the transport of the document G by the first drive roller 23 and the first driven roller 24, the second drive roller 27 and the second driven roller 28 do not sandwich the document G, and thus the driving force of the second drive roller 27 is directly transmitted to the second driven roller 28.

Here, the transmission unit 70 transmits the rotational force from the second driven roller 28 to the first driven roller 24. Accordingly, since the transport force of the document G in the first driven roller 24 increases, it is possible to suppress the transport failure of the document G by the first drive roller 23 and the first driven roller 24.

Further, when the document G is separated from the first drive roller 23 and the first driven roller 24 and is transported by the second drive roller 27 and the second driven roller 28, the driving force of the first drive roller 23 is directly transmitted to the first driven roller 24. The transmission unit 70 transmits the rotational force from the first driven roller 24 to the second driven roller 28. Accordingly, since the transport force of the document G in the second driven roller 28 increases, it is possible to suppress the transport failure of the document G by the second drive roller 27 and the second driven roller 28.

According to the scanner 1, since the reading unit 40 and the transmission unit 70 are not disposed to be separated from each other in the B-axis direction, it is possible to reduce the size of the scanner 1 in the B-axis direction.

According to the scanner 1, since the reading unit 40 and the driving unit 50 are not disposed to be deviated from each other in the B-axis direction, it is possible to reduce the size of the scanner 1 in the B-axis direction.

According to the scanner 1, since the rotational force can be transmitted using one transmission belt 74, it is possible to reduce the number of components to be used and to suppress an increase in the size of the scanner 1 compared to a configuration in which one large gear or a plurality of gears are used as the transmission unit 70.

According to the scanner 1, since the driving force can be transmitted using one driving belt 64, it is possible to reduce the number of components to be used and to suppress an increase in size of the scanner 1, compared to a configuration in which one large gear or a plurality of gears are used as the driving unit 50.

According to the scanner 1, the first friction force F1 generated by the contact between the first friction portion 24B and the first drive roller 23 is transmitted to the second driven roller 28 by the transmission unit 70, and thus it is possible to increase the transport force of the document G of the second driven roller 28 compared to a configuration in which the first friction portion 24B is not provided.

According to the scanner 1, since the second friction force F2 generated by the contact between the second friction portion 28B and the second drive roller 27 is transmitted to the first driven roller 24 by the transmission unit 70, it is possible to increase the transport force of the document G of the first driven roller 24 compared to a configuration in which the second friction portion 28B is not provided.

According to the scanner 1, since the transmission unit 70 and the driving unit 50 are not aligned in the X-axis direction, it is possible to suppress an increase in the size of the scanner 1 in the X-axis direction.

First Modified Example of First Exemplary Embodiment

Hereinafter, the scanner 1 according to a first modified example of the first exemplary embodiment will be specifically described. The same components as those of the scanner 1 according to the first exemplary embodiment are denoted by the same reference numerals, and a description thereof will be omitted.

Figure 10:
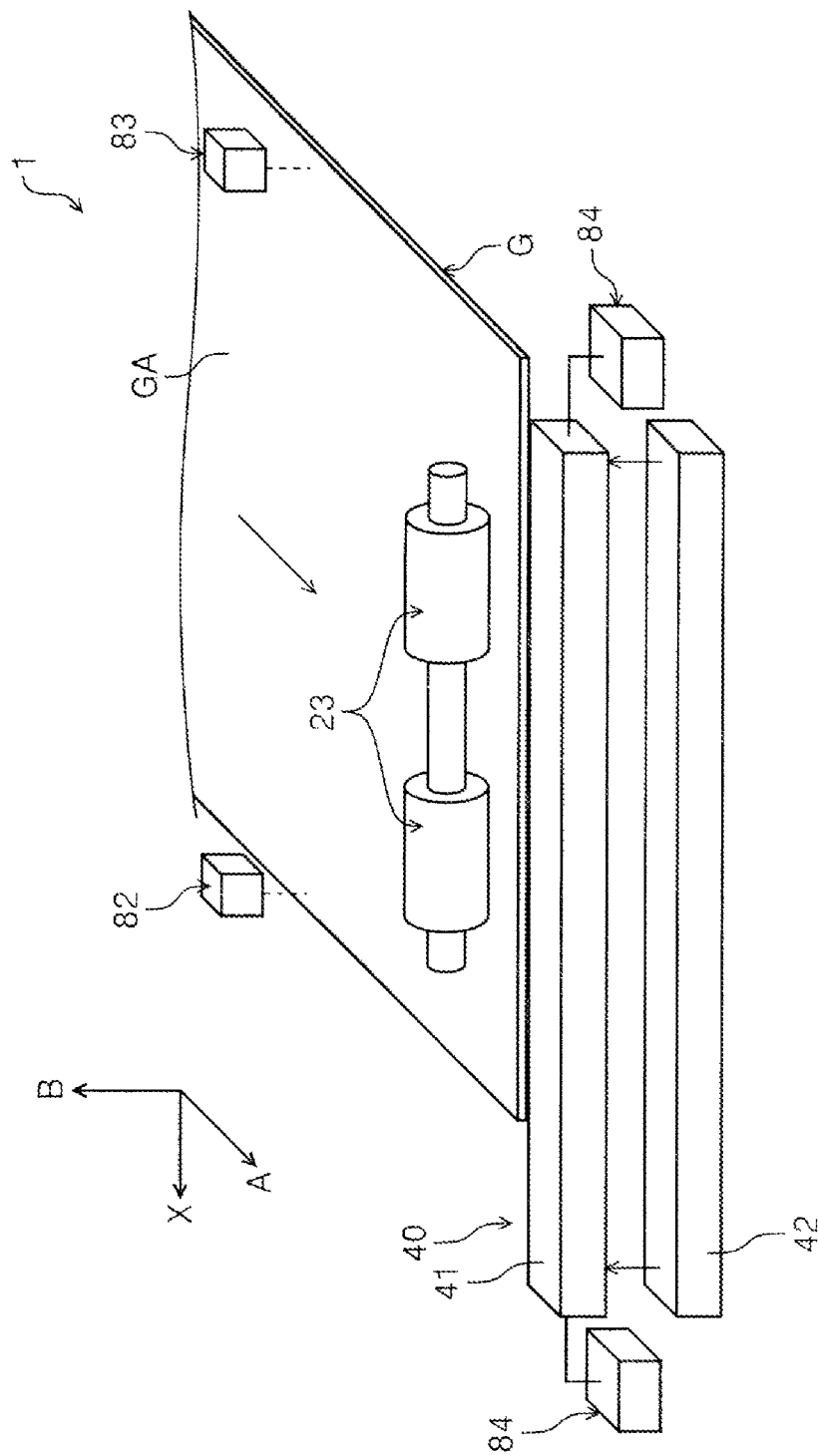
FIG. 10 is a perspective view illustrating a state in which a height of a second reading unit with respect to a first reading unit is changed in a scanner according to a first modified example of the first exemplary embodiment.

As illustrated in FIG. 10, distance measuring sensors 82 and 83 and a cam mechanism unit 84 are added to the scanner 1 of the first modified example of the first exemplary embodiment.

The distance measuring sensors 82 and 83 are located upstream in the +A direction with respect to the first drive roller 23. The distance measuring sensor 82 can measure a distance in the B-axis direction to the front surface GA at the end portion of the document G in the +X direction. The distance measuring sensor 83 can measure a distance in the B-axis direction to the front surface GA at the end portion of the document G in the −X direction. Information about the distance obtained by the distance measuring sensors 82 and 83 is sent to the control unit 18 (FIG. 5).

The cam mechanism unit 84 includes a cam and a motor (not illustrated). The cam mechanism unit 84 can move the first reading unit 41 in the B-axis direction.

The control unit 18 determines the highest position of the front surface GA in the B-axis direction based on the distance information obtained by the distance measuring sensors 82 and 83. Then, the control unit 18 drives the cam mechanism unit 84 so that the front surface GA does not come into contact with the first reading unit 41, thereby raising the first reading unit 41 in the +B direction.

As a result, it is possible to suppress the load caused by the contact between the first reading unit 41 and the document G from acting on the transported document G.

Second Modified Example of First Exemplary Embodiment

Hereinafter, the scanner 1 according to a second modified example of the first exemplary embodiment will be specifically described. The same components as those of the scanner 1 according to the first exemplary embodiment are denoted by the same reference numerals, and a description thereof will be omitted.

Figure 11:
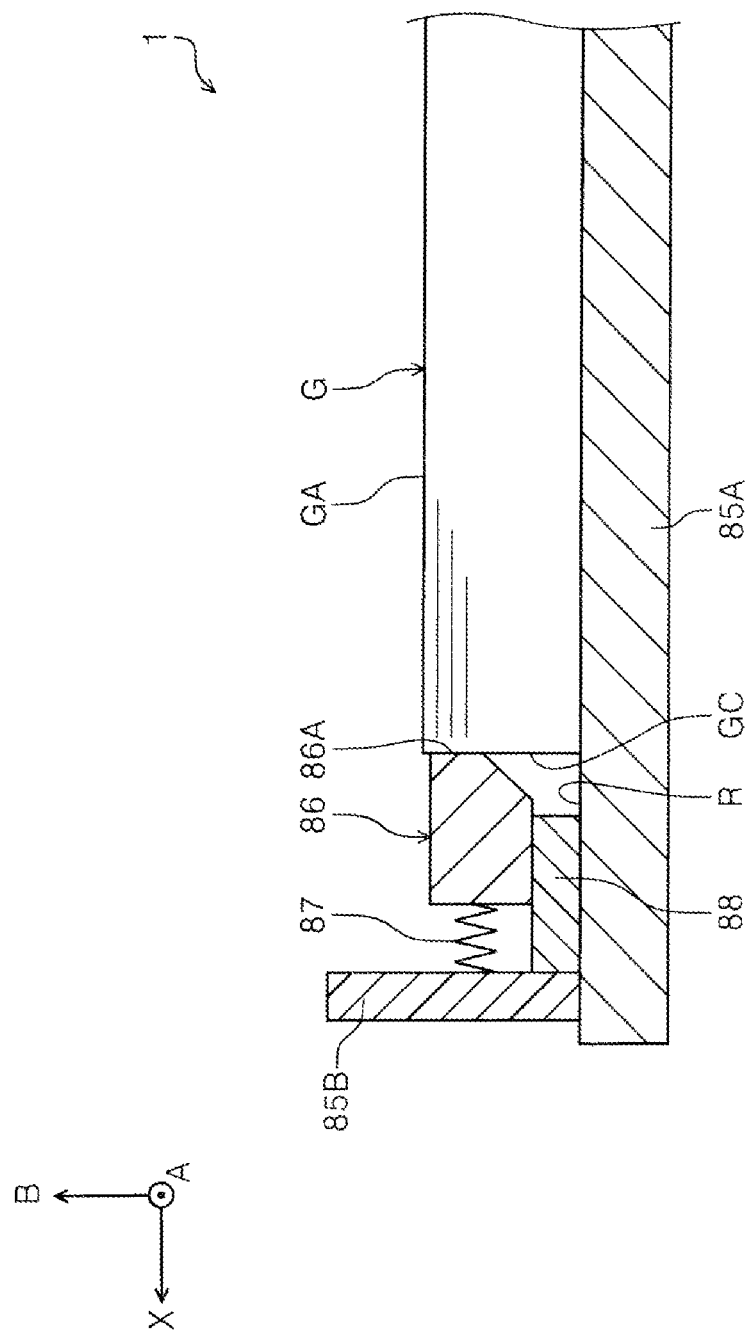
FIG. 11 is a schematic view illustrating a state in which an end portion position of a document in a width direction is corrected by a correction member in a scanner according to a second modified example of the first exemplary embodiment.

As illustrated in FIG. 11, a correction member 86, a spring member 87, and a guide rail 88 are added to the scanner 1 of the second modified example of the first exemplary embodiment.

The transport path R includes a bottom wall 85A and a side wall 85B.

The guide rail 88 has a U-shaped cross-when viewed in the X-axis direction. The guide rail 88 extends from the side wall 85B toward the center of the transport path R in the X-axis direction.

The correction member 86 is formed in a block shape and is guided in the X-axis direction by contact with the guide rail 88. An end surface 86A of the correction member 86 in the X-axis direction is disposed to be capable of coming into contact with a side surface GC of the document G in the X-axis direction.

One end of the spring member 87 is attached to the side wall 85B, and the other end is attached to the correction member 86.

Here, when the document G approaches one side in the X-axis direction, the correction member 86 causes an elastic force received from the spring member 87 to act on the side surface GC. Accordingly, since the skew of the document G with respect to the +A direction is corrected and the document G is pushed back to the center of the transport path R in the X-axis direction, it is possible to suppress the transport failure of the document G.

Third Modified Example of First Exemplary Embodiment

Hereinafter, the scanner 1 according to a third modified example of the first exemplary embodiment will be specifically described. The same components as those of the scanner 1 according to the first exemplary embodiment are denoted by the same reference numerals, and a description thereof will be omitted.

Figure 12:
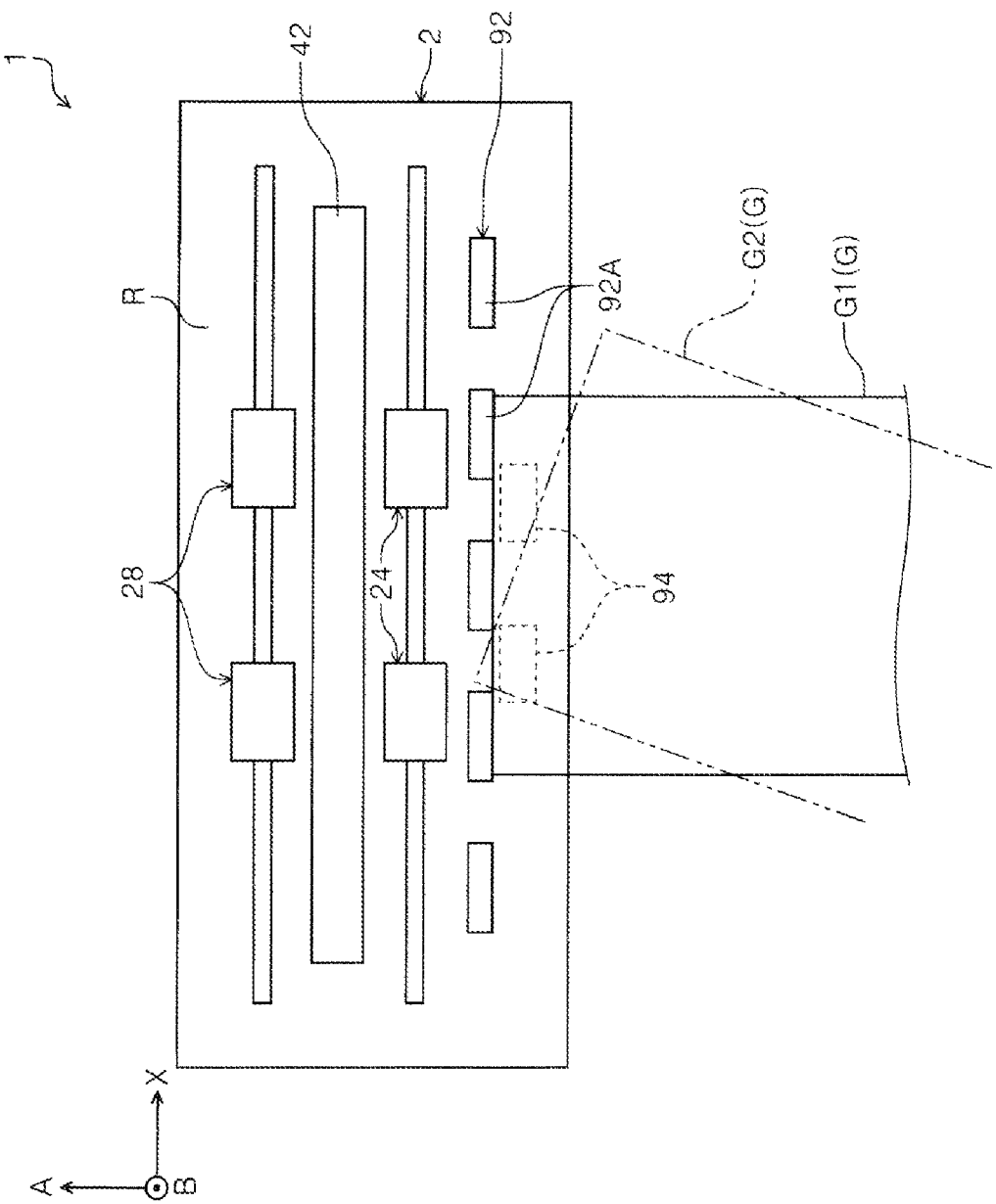
FIG. 12 is a schematic view illustrating a state in which a skew of a document is reduced in a scanner according to a third modified example of the first exemplary embodiment.

As illustrated in FIG. 12, a shutter member 92 and a pickup roller 94 are added to the scanner 1 of the third modified example of the first exemplary embodiment.

The shutter member 92 is provided at a position in the −A direction with respect to the first driven roller 24 in the transport path R. The shutter member 92 is provided to be capable of protruding operation in the +B direction and retracting operation in the −B direction in the transport path R by being driven by a motor and a cam (not illustrated). The shutter member 92 includes, for example, a plurality of restricting portions 92A aligned at intervals in the X-axis direction.

The pickup roller 94 is provided at a position in the −A direction with respect to the shutter member 92 in the transport path R. The pickup roller 94 is, for example, rotationally driven by the transport motor 52 (FIG. 5).

Here, it is assumed that the skewed document G2 is being transported with the shutter member 92 protruding. The movement of the skewed document G2 in the +A direction is restricted by contact with the plurality of restricting portions 92A. In this state, the skew state of the document G2 is improved by the pickup roller 94 being rotated. That is, the document G becomes a document G1 along the A-axis direction.

The state where the document G becomes the document G1 may be detected by an operation time of the pickup roller 94 or may be detected using a sensor (not illustrated).

When the document G becomes the document G1, the shutter member 92 is retracted, so that the document G1 can be transported. In this manner, the skew of the document G may be reduced before the document G enters the first driven roller 24.

Second Exemplary Embodiment

Hereinafter, the scanner 100 according to a second exemplary embodiment will be specifically described. The same components as those of the scanner 1 according to the first exemplary embodiment are denoted by the same reference numerals, and a description thereof will be omitted.

Figure 13:
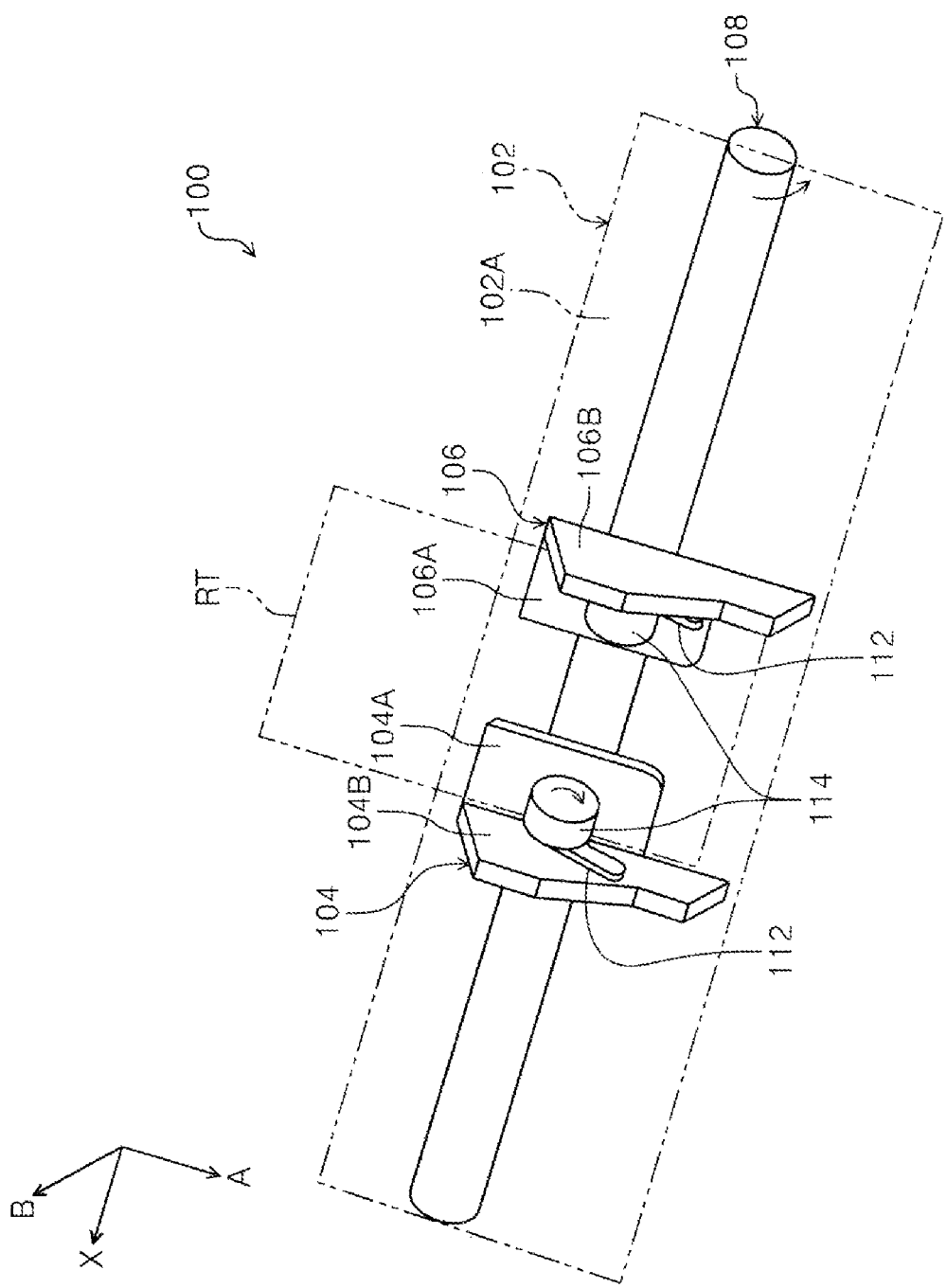
FIG. 13 is a partial perspective view illustrating a state in which a receipt is placed at a placement unit in a scanner according to a second exemplary embodiment.

As illustrated in FIG. 13, the scanner 100 is an example of an image reading apparatus that reads a receipt RT. The scanner 100 includes a placement unit 102, edge guides 104 and 106, a magnet roller 108, two arm members 112, and two third driven rollers 114, instead of the upper opening/closing unit 10 and the edge guides 12 and 13 (FIG. 2) in the scanner 1 (FIG. 2). Other configurations are basically the same as those of the scanner 1.

The placement unit 102 is located upstream from the first drive roller 23 and the first driven roller 24 (FIG. 2) in the +A direction in the apparatus main body 2 (FIG. 2). The placement unit 102 is a plate-like portion having a predetermined thickness in the B-axis direction. A surface of the placement unit 102 in the +B direction is an upper surface 102A. The receipt RT, which is an example of a medium, is placed at the placement unit 102. The document G can also be placed at the placement unit 102.

The width of the receipt RT in the X-axis direction is shorter than the width of the normal document G (FIG. 2), and the thickness of the receipt RT in the B-axis direction is thinner than the thickness of the normal document G.

Slits (not illustrated) that guide the edge guides 104 and 106 (to be described below) in the X-axis direction are formed in the placement unit 102. Further, a pinion (not illustrated) for moving the edge guides 104 and 106 in the X-axis direction is provided at the placement unit 102.

The edge guides 104 and 106 are provided symmetrically in the X-axis direction with respect to the center of the placement unit 102. The edge guides 104 and 106 are located in the +B direction with respect to the upper surface 102A. The edge guides 104 and 106 are located upstream in the +A direction with respect to the feeding roller 14 and the separation roller 15 (FIG. 2).

The edge guide 104 has a bottom wall portion 104A along the placement unit 102 and a vertical wall portion 104B standing upright in the +B direction from the bottom wall portion 104A.

The edge guide 106 has a bottom wall portion 106A along the placement unit 102 and a vertical wall portion 106B standing upright in the +B direction from the bottom wall portion 106A.

Each of the bottom wall portion 104A and the bottom wall portion 106A is provided with a rack portion (not illustrated). In the placement unit 102, each rack portion is driven by the rotation of the pinion of the placement unit 102, and thus the edge guides 104 and 106 are movable in a direction approaching each other and in a direction away from each other.

The magnet roller 108 is an example of a third drive roller rotatably provided in the placement unit 102, and generates a magnetic force. The magnet roller 108 is located in the −B direction with respect to the upper surface 102A. The magnet roller 108 is provided to be rotatable about a rotation axis along the X-axis direction. As an example, the magnet roller 108 is rotated by receiving a driving force from the transport motor 52 (FIG. 5).

One arm member 112 is provided at each of the vertical wall portions 104B and 106B. A part of the arm member 112 is coupled to the vertical wall portions 104B and 106B to be rotatable about the X-axis direction as the central axis direction. Accordingly, the arm member 112 can swing in the A-B plane in the vertical wall portions 104B and 106B. The arm member 112 is provided with, for example, an operation unit and a bistable spring (not illustrated). Accordingly, when the user operates the operation unit, the posture of the arm member 112 is stabilized at each of the first position close to the bottom wall portions 104A and 106A and the second position away from the bottom wall portions 104A and 106A in the +B direction.

The third driven roller 114 is provided to be rotatable about the X-axis direction as the central axis direction in a portion on the opposite side to the central axis side of the arm member 112. In other words, the third driven roller 114 is rotatably provided at the edge guides 104 and 106. In addition, the third driven roller 114 presses the receipt RT against the bottom wall portions 104A and 106A by the action of its own weight. The pressing force with which the third driven roller 114 presses the receipt RT is a pressing force having a magnitude such that the user can correct the skew of the receipt RT by hand in a state in which the pressing force acts.

In the scanner 100, the receipt RT is located between the magnet roller 108 and the third driven roller 114.

The third driven roller 114 is provided with a magnet (not illustrated). This magnet generates a repulsive force against the magnetic force received by the rotation of the magnet roller 108. That is, the third driven roller 114 is rotated by the repulsive force by receiving a magnetic force according to the rotation of the magnet roller 108, and transports the receipt RT in the +A direction. The length of the third driven roller 114 in the X-axis direction is shorter than the length of the magnet roller 108 in the X-axis direction.

Next, actions of the scanner 100 according to the second exemplary embodiment will be described. Since the configuration of each portion in the placement unit 102 is symmetrical in the X-axis direction, the configuration in the +X direction will be illustrated and described, and the configuration in the −X direction will not be illustrated and described.

Figure 14:
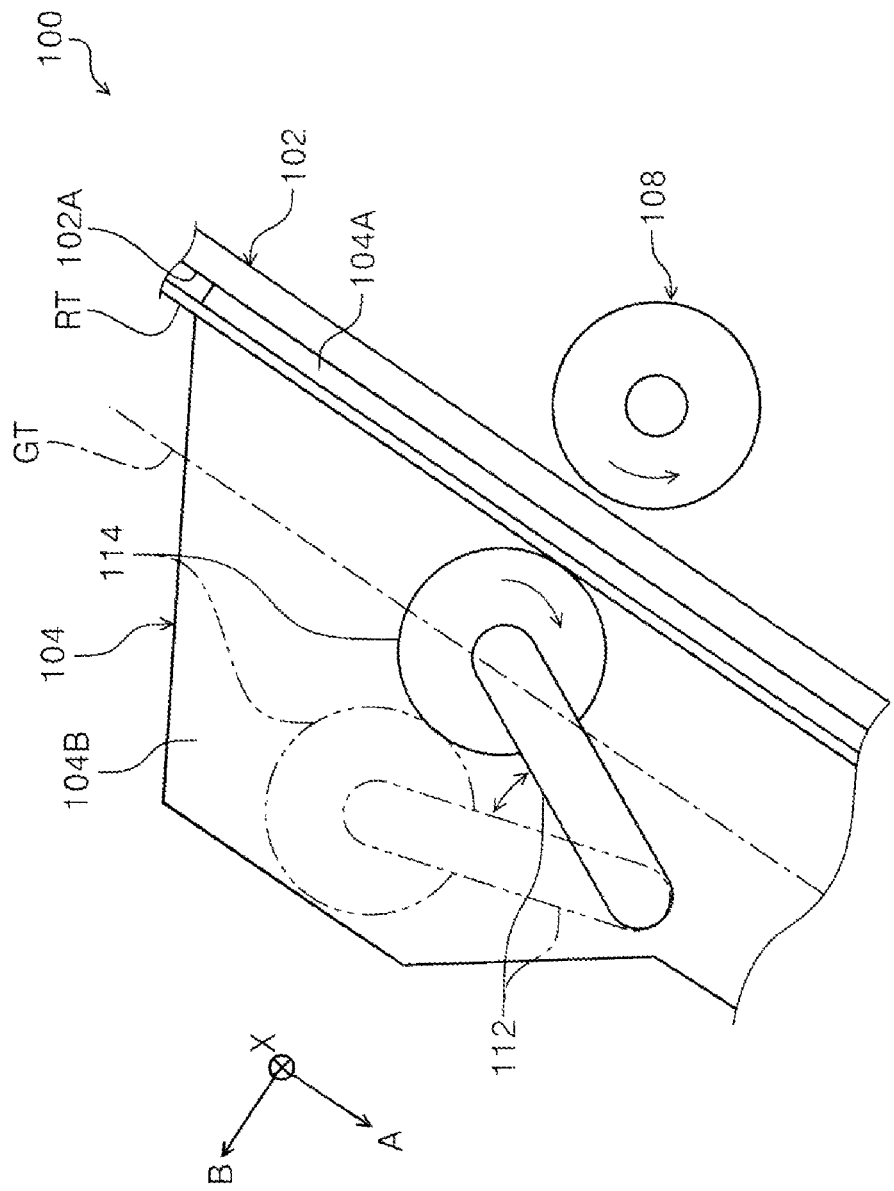
FIG. 14 is a schematic view illustrating a state in which a third driven roller is swung in the scanner according to the second exemplary embodiment.

As illustrated in FIG. 14, when the receipt RT is placed at the placement unit 102, the third driven roller 114 presses the receipt RT against the bottom wall portion 104A. That is, the receipt RT is sandwiched between the bottom wall portion 104A and the third driven roller 114. As a result, the receipt RT is less likely to float in the +B direction. The receipt RT is transported downstream in the +A direction by the third driven roller 114 being rotated along with the rotation of the magnet roller 108. Movement in the X-axis direction of both end portions of the receipt RT in the X-axis direction is restricted by the edge guide 104, and therefore skewing is unlikely to occur.

On the other hand, in a case where a document GT having a large thickness is placed at the placement unit 102, the third driven roller 114 is retracted in the +B direction with respect to the document GT by operating the arm member 112. Then, the document GT moves toward the feeding roller 14 (FIG. 2) by its own weight. In this manner, since the pressing force by the third driven roller 114 does not act on the document GT, an unnecessary transport load in a case where the document GT moves in the +A direction does not act.

Movement in the X-axis direction of both end portions of the document GT in the X-axis direction is restricted by the edge guide 104, and therefore skewing is unlikely to occur.

As described above, according to the scanner 100, the positional deviation of the document G in the X-axis direction is suppressed by moving the edge guides 104 and 106 in accordance with the size of the document G in the X-axis direction.

Since the receipt RT can be located between the magnet roller 108 and the third driven roller 114, the receipt RT is prevented from floating in the B axis direction, which is the thickness direction of the receipt RT. In addition, since the magnet roller 108 and the third driven roller 114 are rotated, a load acting on the receipt RT from the magnet roller 108 and the third driven roller 114 is suppressed compared to a configuration in which the magnet roller 108 and the third driven roller 114 do not rotate. By these actions, it is possible to stabilize the posture and the transport state of the receipt RT transported in the +A direction.

According to the scanner 100, the receipt RT is pressed against the placement unit 102 by the weight of the third driven roller 114. The third driven roller 114 is rotated by receiving the magnetic force in accordance with the rotation of the magnet roller 108. As a result, the rotation of the magnet roller 108 and the rotation of the third driven roller 114 can be synchronized with each other, and the third driven roller 114 can be prevented from slipping with respect to the transported receipt RT.

In the present exemplary embodiment, as an example, not only the weight of the third driven roller 114 but also an attractive force acting between the third driven roller 114 and the magnet roller 108 and an elastic force of a bistable spring (not illustrated) act on the receipt RT.

First Modified Example of Second Exemplary Embodiment

Hereinafter, the scanner 120 according to a first modified example of the second exemplary embodiment will be specifically described. The same components as those of the scanner 1 according to the first exemplary embodiment and the scanner 100 according to the second exemplary embodiment are denoted by the same reference numerals, and a description thereof will be omitted.

Figure 15:
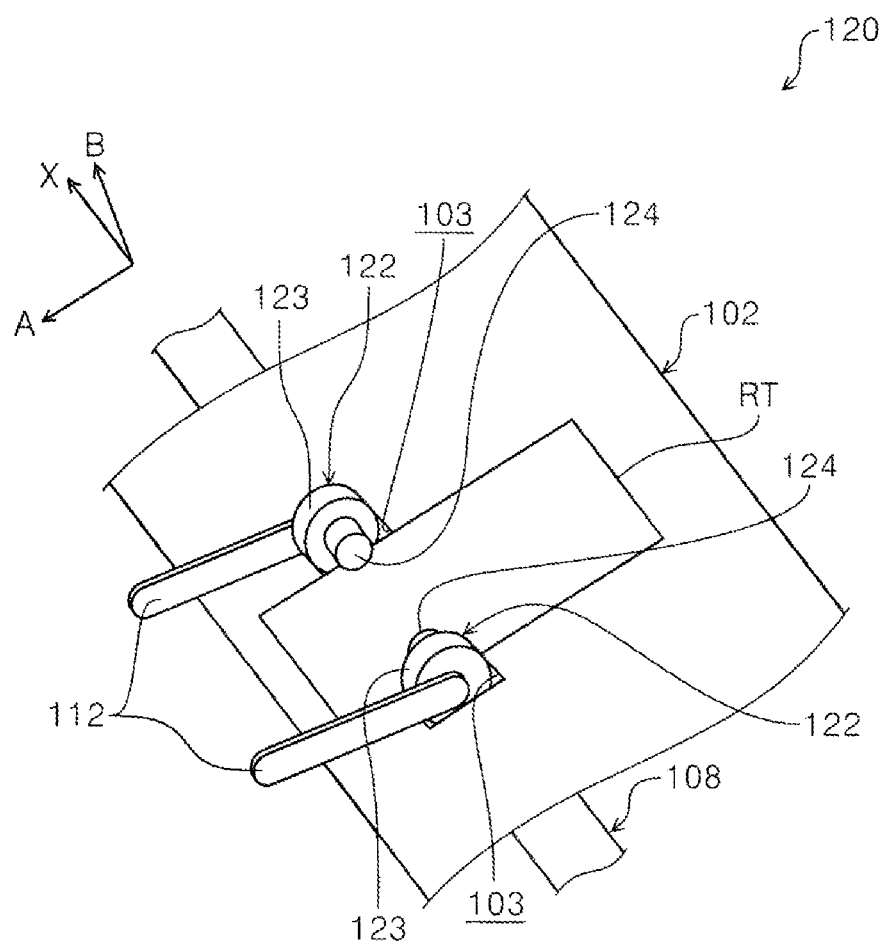
FIG. 15 is a partial perspective view illustrating a state in which a receipt is placed at a placement unit in a scanner according to a first modified example of the second exemplary embodiment.

As illustrated in FIG. 15, the scanner 120 according to the first modified example of the second exemplary embodiment is an example of an image reading apparatus that reads the document G. The scanner 120 includes the placement unit 102, the magnet roller 108, the two arm members 112, and two fourth driven rollers 122.

The placement unit 102 is provided with two concave portions 103 that are exposed in the +B direction.

The arm member 112 is provided at the main body frame 4A (FIG. 2) and extends toward the placement unit 102.

The fourth driven roller 122 is rotated by a repulsive force generated with respect to the magnetic force received with the rotation of the magnet roller 108. The fourth driven roller 122 is a stepped roller and is rotatably supported by the arm member 112. To be specific, the fourth driven roller 122 includes a disk portion 123 and a protruding portion 124.

The disk portion 123 is a circular portion when viewed from the X-axis direction. The protruding portion 124 is a columnar portion protruding in the X-axis direction from the central portion of the disk portion 123. When viewed from the X-axis direction, the center position of the disk portion 123 and the center position of the protruding portion 124 are aligned with each other.

In the scanner 120, when the arm member 112 is swung, a part of the outer periphery of the disk portion 123 enters the concave portion 103. The two disk portions 123 sandwich the receipt RT in the X-axis direction. Movement of the receipt RT in the X-axis direction is thereby restricted. In addition, the two protruding portions 124 press the receipt RT against the placement unit 102. As a result, floating of the receipt RT in the +B direction is suppressed. Here, the receipt RT is transported in the +A direction by the fourth driven roller 122 being rotated along with the rotation of the magnet roller 108. In this manner, even in a configuration without an edge guide, it is possible to stabilize the transport state of the receipt RT.

Second Modified Example of Second Exemplary Embodiment

Hereinafter, a scanner 130 according to a second modified example of the second exemplary embodiment will be specifically described. The same components as those of the scanner 1 according to the first exemplary embodiment and the scanner 100 according to the second exemplary embodiment are denoted by the same reference numerals, and a description thereof will be omitted.

Figure 16:
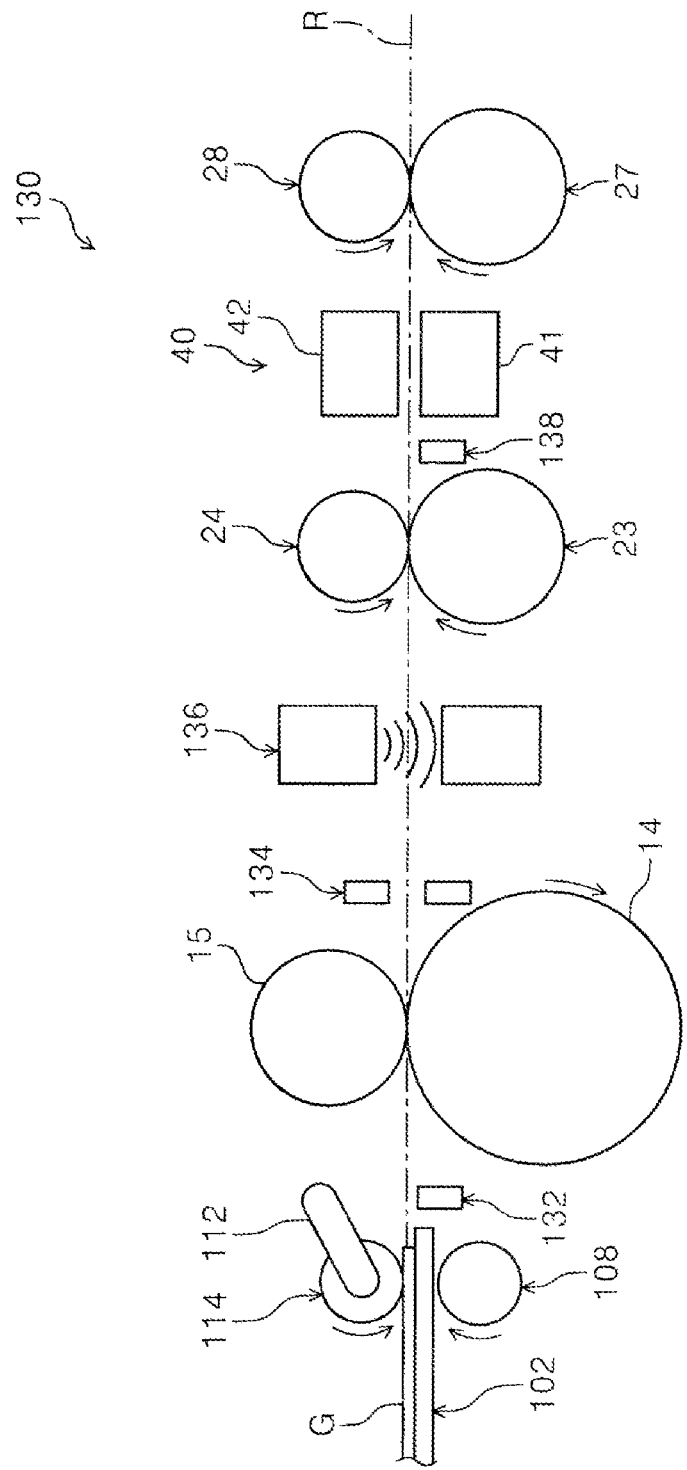
FIG. 16 is a schematic view illustrating a transport path of a document and a peripheral portion of the transport path in a scanner according to a second modified example of the second exemplary embodiment.

As illustrated in FIG. 16, the scanner 130 according to the second modified example of the second exemplary embodiment is an example of an image reading apparatus that reads the document G. The scanner 130 includes the placement unit 102, the magnet roller 108, the arm member 112, and the third driven roller 114.

Further, the scanner 130 includes a first sensor 132, a second sensor 134, a third sensor 136, and a fourth sensor 138.

The first sensor 132 is provided between the magnet roller 108 and the feeding roller 14 in the +A direction. The first sensor 132 is formed of an optical sensor and can detect the presence or absence of the document G in the transport path R.

The second sensor 134 is provided between the feeding roller 14 and the separation roller 15, and the first transport roller pair 22 in the +A direction. The second sensor 134 is formed of an optical sensor and can detect the presence or absence of the document G in the transport path R.

The third sensor 136 is provided between the second sensor 134 and the first transport roller pair 22 in the +A direction. The third sensor 136 is formed of an ultrasonic sensor and can detect the presence or absence of double-feeding of the document G in the transport path R.

The fourth sensor 138 is provided between the first transport roller pair 22 and the reading unit 40 in the +A direction. The fourth sensor 138 is formed of an optical sensor and can detect the presence or absence of the document G in the transport path R.

In the scanner 130, as an example, when a leading end of the document G is detected by the second sensor 134, the rotation of the magnet roller 108 is stopped. When the fourth sensor 138 detects a rear end of the document G, the rotation of the magnet roller 108 is resumed. By performing control in this manner, it becomes easy to know an appropriate feeding timing when the document G is continuously fed.

Third Embodiment

Hereinafter, a scanner 140 according to a third exemplary embodiment will be specifically described. The same components as those of the scanner 1 according to the first exemplary embodiment are denoted by the same reference numerals, and a description thereof will be omitted.

Figure 17:
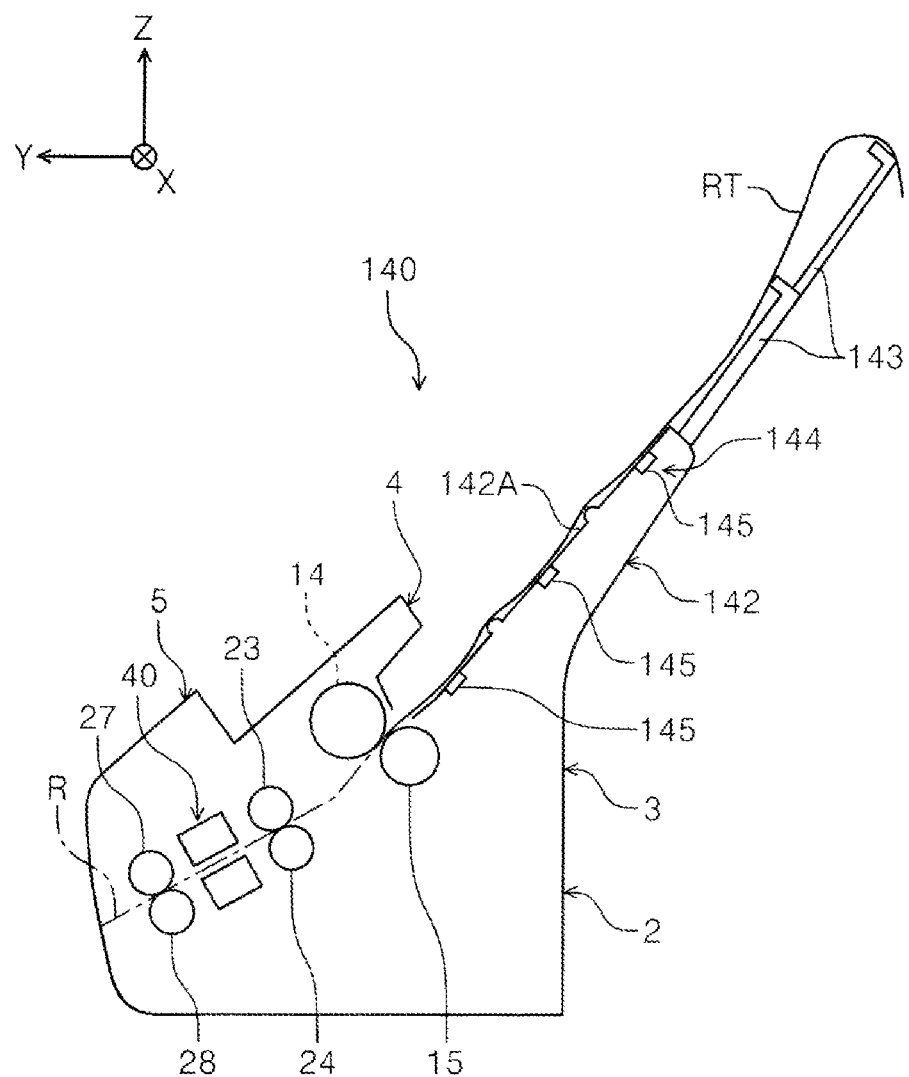
FIG. 17 is a schematic view illustrating a state in which a receipt is electrostatically attracted to a paper support portion in a scanner according to a third exemplary embodiment.

As illustrated in FIG. 17, the scanner 140 is an example of an image reading apparatus that reads a document G. The scanner 140 includes the apparatus main body 2, the feeding roller 14, the separation roller 15, the first drive roller 23, the first driven roller 24, the second drive roller 27, the second driven roller 28, and the reading unit 40. The scanner 140 further includes a document support portion 142 and a static electricity generation unit 144.

The document support portion 142 is an example of a placement unit at which the receipt RT is placed. The document support portion 142 is located upstream in the +A direction with respect to the first drive roller 23 and the first driven roller 24 in the apparatus main body 2. The document support portion 142 extends from the apparatus main body 2 toward a position in the −Y direction and the +Z direction when viewed from the X-axis direction. A plurality of paper support portions 143 are provided in the document support portion 142 in a drawable manner. A long receipt RT can be supported by the document support portion 142. The surface of the document support portion 142 at which the receipt RT is placed is referred to as a placement surface 142A.

The static electricity generation unit 144 is provided in the document support portion 142. The static electricity generation unit 144 includes, for example, a plurality of electrodes 145. The plurality of electrodes 145 are aligned at intervals on the placement surface 142A. A voltage is applied to the plurality of electrodes 145 from a power source (not illustrated). Whether or not the voltage is applied to the plurality of electrodes 145 is controlled by the control unit 18 (FIG. 5).

When a voltage is applied, the static electricity generation unit 144 can generate an electrostatic force that attracts the receipt RT toward the document support portion 142.

Next, actions of the scanner 140 according to the third exemplary embodiment will be described.

In the scanner 140, the static electricity generation unit 144 generates a electrostatic force to attract the receipt RT to the document support portion 142. This stabilizes the orientation of the receipt RT, making it easier for the receipt RT to enter between the feeding roller 14 and the separation roller 15, and to enter between the first drive roller 23 and the first driven roller 24.

Fourth Exemplary Embodiment

Hereinafter, a scanner 150 according to a fourth exemplary embodiment will be specifically described. The same components as those of the scanner 1 according to the first exemplary embodiment are denoted by the same reference numerals, and a description thereof will be omitted.

Figure 18:
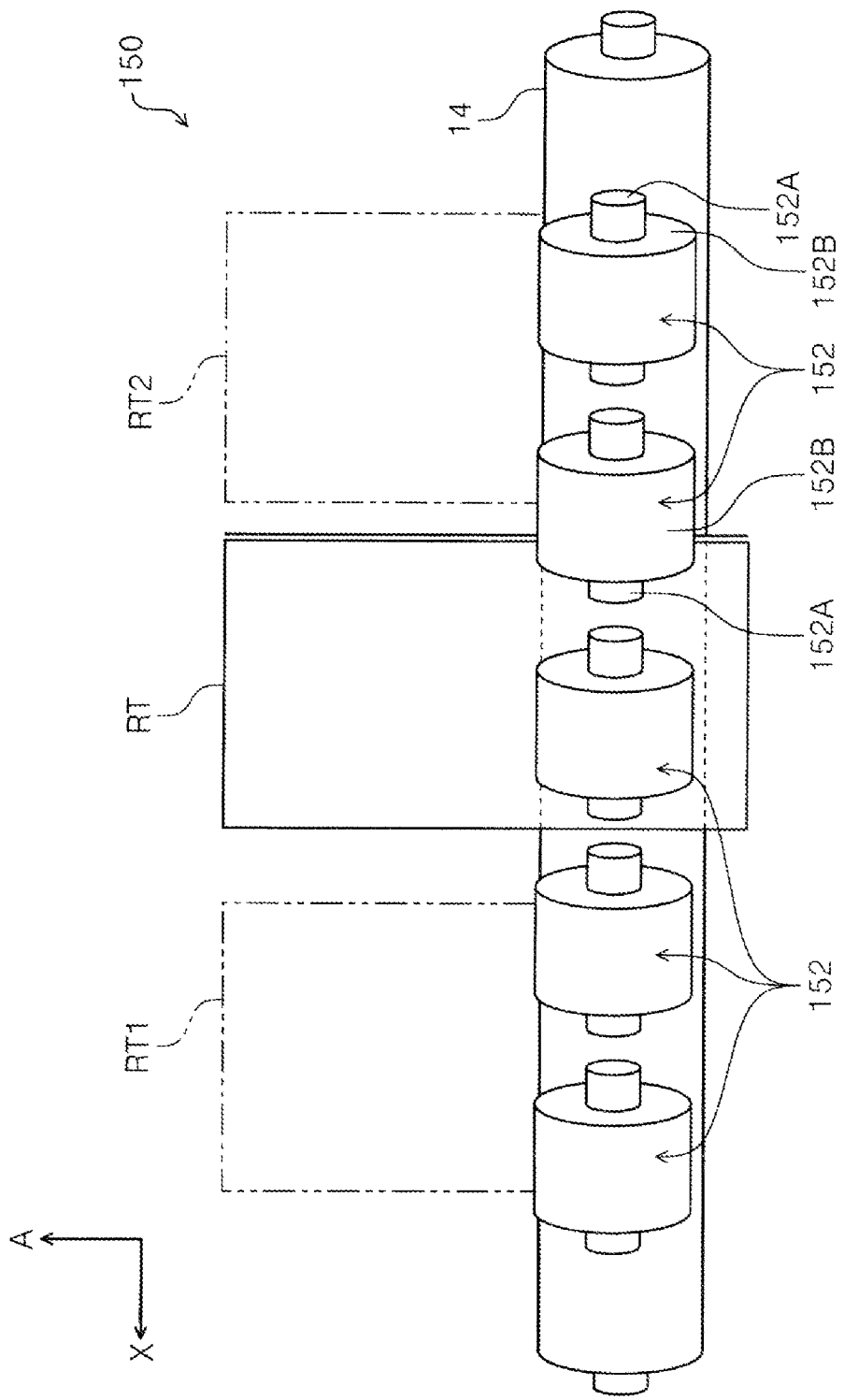
FIG. 18 is a schematic view illustrating a state in which a plurality of separation rollers are provided in an axial direction in a scanner according to a fourth exemplary embodiment.

As illustrated in FIG. 18, the scanner 150 is an example of an image reading apparatus that reads a document G. The scanner 150 includes a plurality of separation rollers 152 instead of the separation roller 15 (FIG. 2) in the scanner 1 (FIG. 2). The configuration other than the plurality of separation rollers 152 is the same as that of the scanner 1.

The feeding roller 14 is rotatably provided upstream in the +A direction with respect to the first drive roller 23 and the first driven roller 24 (FIG. 2). The feeding roller 14 feeds the receipt RT downstream in the +A direction.

The separation roller 152 includes, for example, a cylindrical shaft portion 152A extending in the X-axis direction and a cylindrical contact portion 152B attached to the shaft portion 152A. The plurality of separation rollers 152 are provided at intervals in the X-axis direction in first unit 3 (FIG. 2). In other words, the plurality of contact portions 152B are provided at intervals in the X-axis direction and can come into contact with the receipt RT. To be specific, the plurality of contact portions 152B are disposed so that at least two contact portions 152B can contact one receipt RT.

In FIG. 18, five separation rollers 152 are illustrated as an example, but the number of separation rollers 152 may be a plurality other than five. Further, the plurality of contact portions 152B may be provided for one long shaft portion 152A.

The separation rollers 152 sandwiches the receipt RT with the feeding roller 14. The separation roller 152 can separate the receipts RT fed by the feeding roller 14 one by one. To be specific, the separation roller 152 is configured to rotate when a torque equal to or greater than a predetermined value is input, but not to rotate when the input torque is less than the predetermined value. As a result, the separation roller 152 can separate the receipts RT one by one.

Next, actions of the scanner 150 according to the fourth exemplary embodiment will be described.

According to the scanner 150, since the plurality of contact portions 152B are provided at intervals in the X-axis direction, even when the receipt RT is disposed to be deviated in the X-axis direction, at least two of the plurality of contact portions 152B can be brought into contact with the receipt RT. As a result, the receipt RT is less likely to be rotated about the contact portion 152B, and skewing of the receipt RT in a direction intersecting the +A direction can be suppressed.

To be specific, in an ideal state, the receipt RT preferably contacts the two separation rollers 152 at the center in the X-axis direction.

However, a receipt RT that is narrow in the X-axis direction may be transported offset in the +X direction as illustrated by an imaginary line RT1, or may be transported offset in the −X direction as illustrated by an imaginary line RT2.

According to the scanner 150, at least two contact portions 152B come into contact with two points of the receipt RT in the X-axis direction. As a result, the receipt RT is less likely to be rotated in the A-X plane about the contact portion 152B than in a configuration in which only one contact portion 152B contacts the receipt RT. In other words, skewing of the receipt RT in a direction intersecting the +A direction can be suppressed.

Other Modified Examples

The scanners 1, 100, 140, and 150 according to the first, second, third, and fourth exemplary embodiments of the disclosure, including the modified examples, are based on having the configuration as described above, but it is of course possible to change, omit, or combine partial configurations within a range not departing from the gist of the disclosure of the present application. Other modified examples will be described below.

In the scanner 1, the transport path R may not include the reversing unit 34. Further, the transport motor 52 and the switching motor 48 may be configured by one motor. In this case, the transmission path of the driving force may be switched by switching the plurality of gear trains. The transport motor 52 and the switching motor 48 may be provided in the +X direction with respect to the center of the apparatus main body 2 in the X-axis direction.

The drive source for switching the posture of the apparatus main body 2 is not limited to the motor, and may be, for example, a drive source for switching the posture of the apparatus main body 2 using a solenoid and a spring.

The first drive roller 23 and the second drive roller 27 may be driven by different motors.

In the scanner 1, a part of the transmission unit 70 may not overlap a part of the reading unit 40 when viewed in the X-axis direction. A part of the driving unit 50 may not overlap another part of the reading unit 40 when viewed in the X-axis direction. The transmission unit 70 may use a gear train without using the transmission belt 74. The driving unit 50 may use a gear train without using the driving belt 64. The gear train that transmits the driving force from the driving unit 50 may be provided at the first unit 3 on the lower side in the Z direction.

The material constituting the outer peripheral portion of the first driven roller 24 and the material constituting the outer peripheral portion of the first drive roller 23 may be the same. The material constituting the outer peripheral portion of the second driven roller 28 and the material constituting the outer peripheral portion of the second drive roller 27 may be the same.

In the scanner 1, a part of the driving unit 50 and a part of the transmission unit 70 may overlap each other across the transport path R when viewed in the X-axis direction.

The first drive roller 23 and the second drive roller 27 may be disposed in the −B direction with respect to the transport path R, and the first driven roller 24 and the second driven roller 28 may be disposed in the +B direction with respect to the transport path R. That is, the disclosure is not limited to the configuration illustrated in FIG. 6, and a configuration in which the first drive roller 23 and the second drive roller 27 are provided at the first unit 3 on the lower side in the Z direction and the first driven roller 24 and the second driven roller 28 are provided in the second unit 4 on the upper side in the Z direction may be employed.

In the scanner 100, the third drive roller does not need to have a magnetic force like the magnet roller 108. For example, the third driven roller 114 may receive a rotational force from the third drive roller via a gear train.

In a case of a single mode in which the document G or the receipt RT is not continuously supplied and is individually supplied, the separation operation by the separation roller 15 is not necessary. In the single mode, the determination of the double feeding of the document G, etc. may not be performed, or the detection of the double feeding itself may be turned off.

What is claimed is:
1. An image reading apparatus, comprising:
a reading unit configured to read a medium;
a first drive roller configured to be rotationally driven to transport the medium toward the reading unit;
a first driven roller configured to sandwich, together with the first drive roller, the medium, and configured to rotate in a driven manner;

a second drive roller configured to be rotationally driven to transport the medium downstream in a transport direction from the reading unit;

a second driven roller configured to sandwich, together with the second drive roller, the medium, and configured to rotate in the driven manner;

a driving unit configured to rotationally drive the first drive roller and the second drive roller;

a transmission unit configured to transmit a rotational force from one of the first driven roller and the second driven roller to another of the first driven roller and the second driven roller;

a placement unit at which the medium is placed, the placement unit being located upstream from the first drive roller and the first driven roller in the transport direction;

an edge guide provided, at the placement unit, movably in a width direction intersecting the transport direction of the medium, the edge guide being configured to come into contact with an end portion of the medium in the width direction;

a third drive roller rotatably provided at the placement unit; and a third driven roller rotatably provided at the edge guide and configured to transport the medium in association with rotation of the third drive roller.

2. The image reading apparatus according to claim 1, wherein a part of the transmission unit overlaps a part of the reading unit when viewed in the width direction intersecting the transport direction of the medium.

3. The image reading apparatus according to claim 1, wherein a part of the driving unit overlaps another part of the reading unit when viewed in the width direction intersecting the transport direction of the medium.

4. The image reading apparatus according to claim 1, wherein
the driving unit includes a driving belt configured to transmit a driving force from one of the first drive roller and the second drive roller to another of the first drive roller and the second drive roller.

5. The image reading apparatus according to claim 1, wherein
the first driven roller includes a first friction portion configured to generate a first frictional force when the first friction portion comes into contact with the first drive roller, and
the transmission unit is configured to transmit the first frictional force to the second driven roller when the second drive roller and the second driven roller sandwich the medium.

6. The image reading apparatus according to claim 1, wherein
the second driven roller includes a second friction portion configured to generate a second frictional force when the second friction portion comes into contact with the second drive roller, and
the transmission unit is configured to transmit the second frictional force to the first driven roller when the first drive roller and the first driven roller sandwich the medium.

7. The image reading apparatus according to claim 1, wherein
when viewed in the width direction intersecting the transport direction of the medium,
the transmission unit is located on one side with respect to a transport path of the medium, and
the driving unit is located on another side with respect to the transport path.

8. The image reading apparatus according to claim 1, wherein
the third drive roller is a magnet roller configured to generate a magnetic force, and
the third driven roller is configured to rotate by receiving the magnetic force in association with rotation of the magnet roller.

9. The image reading apparatus according to claim 1, comprising:
a static electricity generation unit provided at the placement unit and configured to generate an electrostatic force for attracting the medium toward the placement unit.

10. The image reading apparatus according to claim 1, comprising:
a feeding roller rotatably provided upstream from the first drive roller and the first driven roller in the transport direction and configured to feed the medium downstream in the transport direction; and
a separation roller configured to separate, one by one, a plurality of the medium fed by the feeding roller, wherein
the separation roller includes a plurality of contact portions provided at intervals in the width direction intersecting the transport direction of the medium, and at least two of the plurality of contact portions come into contact with the medium.

11. An image reading apparatus, comprising:
a reading unit configured to read a medium;
a first drive roller configured to be rotationally driven to transport the medium toward the reading unit;
a first driven roller configured to sandwich, together with the first drive roller, the medium, and configured to rotate in a driven manner;
a second drive roller configured to be rotationally driven to transport the medium downstream in a transport direction from the reading unit;
a second driven roller configured to sandwich, together with the second drive roller, the medium, and configured to rotate in the driven manner;
a driving unit configured to rotationally drive the first drive roller and the second drive roller; and
a transmission unit configured to transmit a rotational force from one of the first driven roller and the second driven roller to another of the first driven roller and the second driven roller,
wherein a part of the transmission unit overlaps a part of the reading unit when viewed in a width direction intersecting the transport direction of the medium.

12. The image reading apparatus according to claim 11, wherein
the first driven roller includes a first friction portion configured to generate a first frictional force when the first friction portion comes into contact with the first drive roller, and
the transmission unit is configured to transmit the first frictional force to the second driven roller when the second drive roller and the second driven roller sandwich the medium.

13. The image reading apparatus according to claim 11, wherein
the second driven roller includes a second friction portion configured to generate a second frictional force when the second friction portion comes into contact with the second drive roller, and the transmission unit is configured to transmit the second frictional force to the first driven roller when the first drive roller and the first driven roller sandwich the medium.

14. The image reading apparatus according to claim 11, wherein
when viewed in the width direction intersecting the transport direction of the medium,
the transmission unit is located on one side with respect to a transport path of the medium, and
the driving unit is located on another side with respect to the transport path.

15. An image reading apparatus, comprising:
a reading unit configured to read a medium;
a first drive roller configured to be rotationally driven to transport the medium toward the reading unit;
a first driven roller configured to sandwich, together with the first drive roller, the medium, and configured to rotate in a driven manner;
a second drive roller configured to be rotationally driven to transport the medium downstream in a transport direction from the reading unit;
a second driven roller configured to sandwich, together with the second drive roller, the medium, and configured to rotate in the driven manner;
a driving unit configured to rotationally drive the first drive roller and the second drive roller; and
a transmission unit configured to transmit a rotational force from one of the first driven roller and the second driven roller to another of the first driven roller and the second driven roller,
wherein a part of the driving unit overlaps another a part of the reading unit when viewed in a width direction intersecting the transport direction of the medium.

16. The image reading apparatus according to claim 15, wherein
the first driven roller includes a first friction portion configured to generate a first frictional force when the first friction portion comes into contact with the first drive roller, and
the transmission unit is configured to transmit the first frictional force to the second driven roller when the second drive roller and the second driven roller sandwich the medium.

17. The image reading apparatus according to claim 15, wherein
the second driven roller includes a second friction portion configured to generate a second frictional force when the second friction portion comes into contact with the second drive roller, and
the transmission unit is configured to transmit the second frictional force to the first driven roller when the first drive roller and the first driven roller sandwich the medium.

18. The image reading apparatus according to claim 15, wherein
when viewed in the width direction intersecting the transport direction of the medium,
the transmission unit is located on one side with respect to a transport path of the medium, and
the driving unit is located on another side with respect to the transport path.

* * * * *